US007758032B2

(12) United States Patent
Kawata et al.

(10) Patent No.: US 7,758,032 B2
(45) Date of Patent: Jul. 20, 2010

(54) SHEET PROCESSING APPARATUS AND IMAGE FORMING APPARATUS

(75) Inventors: Wataru Kawata, Kashiwa (JP); Masahiko Yokota, Abiko (JP); Hideaki Kosasa, Abiko (JP); Akihiro Shimizu, Kashiwa (JP); Shoji Takeda, Tokyo (JP); Toshiro Tomono, Toride (JP); Ryuichi Kojima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 11/852,949

(22) Filed: Sep. 10, 2007

(65) Prior Publication Data

US 2008/0061489 A1 Mar. 13, 2008

(30) Foreign Application Priority Data

Sep. 11, 2006 (JP) ............................. 2006-245003
Sep. 11, 2006 (JP) ............................. 2006-245004

(51) Int. Cl.

| | |
|---|---|
| ***B65H 33/04*** | (2006.01) |
| ***B65H 39/00*** | (2006.01) |
| ***B65G 39/04*** | (2006.01) |
| ***B41L 43/00*** | (2006.01) |
| ***B41L 43/12*** | (2006.01) |
| ***B42C 1/00*** | (2006.01) |

(52) U.S. Cl. ........................ 270/32; 270/58.07; 270/37; 270/20.1; 270/45; 270/51; 412/1

(58) Field of Classification Search .............. 270/58.07, 270/32, 37, 20.1, 45, 51
See application file for complete search history.

(56) References Cited

U.S. PATENT DOCUMENTS 5,377,965 A * 1/1995 Mandel et al. ................ 270/37
6,276,677 B1 8/2001 Hommochi
2008/0175691 A1* 7/2008 Wetzel et al. .................. 412/1

FOREIGN PATENT DOCUMENTS

EP 1568507 A1 * 8/2005
JP 11-193175 7/1999
JP 2000-272823 10/2000
JP 2000272823 A * 10/2000

* cited by examiner

*Primary Examiner*—Gene Crawford
*Assistant Examiner*—Yolanda Cumbess
(74) *Attorney, Agent, or Firm*—Canon U.S.A., Inc., IP Division

(57) ABSTRACT

A sheet processing apparatus configured to bind a sheet bundle includes a folding portion configured to fold the sheet bundle, a sheet processing portion provided upstream of the folding portion and configured to form a groove at a fold position of at least one sheet of the sheet bundle, and a controller configured to control an operation of the sheet processing portion. The controller controls an operation of the sheet processing portion such that a width of a groove formed on a sheet located on an outer side of the folded sheet bundle is larger than that of a groove formed on a sheet located on an inner side of the folded sheet bundle.

13 Claims, 15 Drawing Sheets

SHEET PROCESSING APPARATUS AND IMAGE FORMING APPARATUS

BACKGROUND OF THE INVENTION

1. Field of the Invention

The present invention relates to a sheet processing apparatus which binds a sheet bundle with the sheet bundle folded into two, and to an image forming apparatus. More particularly, the present invention relates to a sheet processing apparatus capable of binding a sheet bundle in a good appearance so that unbound edges of sheets of the sheet bundle are unlikely to unfold.

2. Description of the Related Art

Some conventional image forming apparatuses, such as a copying machine and a laser beam printer, have a sheet processing apparatus that performs saddle stitch bookbinding by receiving sheets discharged after images are formed thereon. Subsequently, the sheet processing apparatus performs center-folding of a bundle of sheets or binding a substantially middle portion of the bundle of sheets and then folding the bundle of sheets into two.

Such a conventional sheet processing apparatus may have a bookbinding apparatus that saves space, that is small, and that is low-priced. In such a bookbinding apparatus, in a case where a sheet bundle is bound, a predetermined number of sheets discharged one by one are carried into a substantially vertically longitudinal accommodation guide.

Then, leading edges in a sheet carrying-in direction of the sheets are positioned by being made to contact a sheet positioning member preliminarily placed at a predetermined binding position. Subsequently, alignment in a width direction of the sheets is performed. Then, central portions of the sheets are saddle-stitched by a stapler so as to form a sheet bundle. Next, the saddle-stitched portion of the bundle of the sheets is pushed between a folding roller pair. Thus, bookbinding is performed by folding the middle portion of the sheet bundle. Then, the bound sheet bundle is discharged, with the fold position in the lead, to a discharge tray from a discharge port provided at a discharge side of the folding roller pair (see Japanese Patent Application Laid-Open No. 11-193175, corresponding to U.S. Pat. No. 6,276,677).

FIG. 15 illustrates a conventional image forming apparatus 300 and a conventional sheet processing apparatus 501, which has a conventional bookbinding apparatus. In a case where a sheet bundle is bound, the sheet processing apparatus 501 first receives a sheet S discharged from the image forming apparatus 300. Subsequently, the sheet processing apparatus 501 carries the sheet S into a saddle stitch processing tray 540. Thereafter, the sheet processing apparatus 501 performs alignment of the sheet S. This process is performed until a predetermined number of sheets S are carried into the saddle stitching tray 540.

Next, when a predetermined number of sheets S are conveyed to the saddle stitch processing tray 540, stitching (or two-position binding) of a sheet bundle is performed to bind the sheet bundle. Subsequently, a sheet positioning plate 71 supporting the sheet bundle from below is lowered to a position at which the height of the center of the sheet bundle is equal to that of a sheet pushing plate 72 and that of a nip portion between sheet folding rollers 73.

Then, the center of the sheet bundle is pushed by the sheet pushing plate 72. Thus, the center of the sheet bundle is moved towards the sheet folding rollers 73. Consequently, the sheet bundle is nipped by the sheet folding rollers 73 to be folded into two. The sheet bundle folded into two is discharged, with the fold position in the lead, to a saddle stitch discharge tray 515 by the sheet folding rollers 73 and a discharge roller pair 74.

However, the conventional bookbinding apparatus performing such a conventional bookbinding process and the conventional image forming apparatus have drawbacks in that as the number of sheets of a sheet bundle increases, stiffness of the sheet bundle increases, thus resulting in insufficient folding, so that unbound edges of sheets of the sheet bundle are likely to unfold, and that the appearance of the bound sheet bundle is not good. Also, the conventional apparatuses have another drawback in that because unbound edges of sheets of the sheet bundle are likely to unfold, it is difficult to stack a plurality of sheet bundles.

To solve the above drawbacks, an apparatus has been developed, which forms a groove on a fold line portion of each sheet of a sheet bundle to facilitate sufficiently folding the sheet bundle (see Japanese Patent Application Laid-Open No. 2000-272823). However, the groove formed on each sheet of the sheet bundle has a uniform width. Accordingly, the conventional apparatus has drawbacks that in a case where the thickness of the sheet bundle increases, the outer the sheet of the sheet bundle, the more difficult the folding of the sheet is, and that the appearance of the sheet bundle is worsened after the sheet bundle is folded.

SUMMARY OF THE INVENTION

The present invention is directed to a sheet processing apparatus and an image forming apparatus, which can bind a sheet bundle in a good appearance so that unbound edges of sheets of the sheet bundle are unlikely to unfold.

According to an aspect of the present invention, a sheet processing apparatus configured to bind a sheet bundle includes a folding portion configured to fold the sheet bundle, a sheet processing portion configured to form a groove on a sheet at a fold position of the sheet bundle folded by the folding portion, and a controller configured to control an operation of the sheet processing portion. The controller controls an operation of the sheet processing portion such that a width of a groove formed on a sheet located on an outer side of the folded sheet bundle is larger than that of a groove formed on a sheet located on an inner side of the folded sheet bundle.

According to another aspect of the present invention, an image forming apparatus includes an image forming portion configured to form an image on a sheet, a sheet processing apparatus configured to bind a sheet bundle of sheets on which an image is formed, and a controller configured to control the sheet processing apparatus. The sheet processing apparatus includes a folding portion configured to fold the sheet bundle, and a sheet processing portion configured to form a groove on a sheet at a fold position of the sheet bundle folded by the folding portion. The controller controls an operation of the sheet processing portion such that a width of a groove formed on a sheet located on an outer side of the folded sheet bundle is larger than that of a groove formed on a sheet located on an inner side of the folded sheet bundle.

According to an exemplary embodiment of the present invention, a groove is formed at a fold position of at least one sheet of the sheet bundle with a laser beam so that a width of a groove formed on a sheet located on an outer side of the folded sheet bundle is larger than that of a groove formed on a sheet located on an inner side of the folded sheet bundle. Consequently, a sheet bundle can be bound in a good appearance so that unbound edges of sheets of the sheet bundle are unlikely to unfold.

Further features and aspects of the present invention will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10A illustrates the entire sheet. FIG. 10B is an enlarged view of the groove.

FIG. 11A is a perspective view illustrating a bundle of sheets subjected to two-position binding. FIG. 11B is a perspective view of a sheet bundle subjected to one-position corner binding.

DETAILED DESCRIPTION OF THE EMBODIMENTS

Various exemplary embodiments, features, and aspects of the invention will be described in detail below with reference to the drawings.

Figure 1:
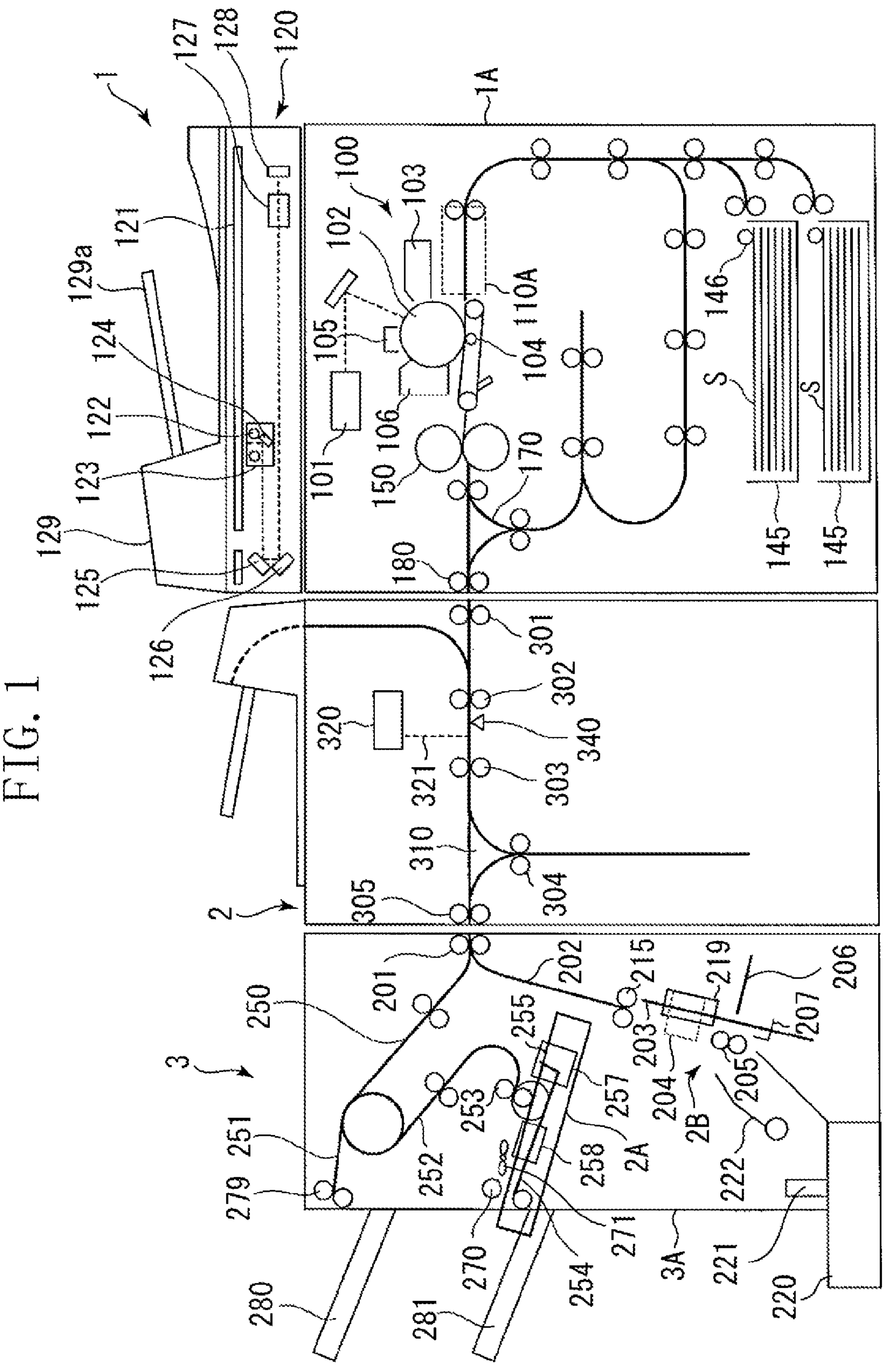
FIG. 1 illustrates a copying machine serving as an image forming apparatus having a sheet processing apparatus according to an exemplary embodiment of the invention.

FIG. 1 illustrates a copying machine, serving as an image forming apparatus, having a sheet processing apparatus according to an exemplary embodiment of the invention.

As illustrated in FIG. 1, an image reading apparatus 120, which reads a document image, is provided on the top of a copying machine body 1A of a copying machine 1. A sheet processing apparatus 3, which performs processing on a sheet S discharged from the copying machine body 1A, is provided at a side of the copying machine body 1A.

An image forming portion 100 including a charging device 105, a cylindrical photosensitive drum 102, and a developing device 103 is provided in the copying machine body 1A. A fixing device 150 and a discharge roller pair 180 are disposed downstream of the image forming portion 100. The image reading apparatus 120 includes a platen glass plate 121 serving as a document positioning plate, a scanner unit 123, and a document feeder 129, which feeds a document to the platen glass plate 121.

The sheet processing apparatus 3 includes a sheet processing apparatus body 3A, which performs binding and punching on a sheet S, and a sheet conveyance apparatus 2, which is provided between the sheet processing apparatus body 3A and the copying machine body 1A and includes a laser processing unit 320.

An image is formed on the sheet S in the copying machine body 1A. Subsequently, the sheet S is conveyed into the sheet conveyance apparatus 2. Then, the laser processing unit 320, serving as a sheet processing portion, performs processing, which will be described later, on the sheet S. Thereafter, the sheet S is conveyed to the sheet processing apparatus 3A, in which processing such as binding or punching is performed on the sheet S. The sheet conveyance apparatus 2 has an inlet roller pair 301, a sheet edge detection sensor 340, and a sheet reversing portion 310 in addition to the laser processing unit 320.

The sheet processing apparatus body 3A includes a binding portion 2A and a bookbinding portion 2B. The binding portion 2A binds, with a stapler 257, image-formed sheets discharged from the copying machine body 1A. The bookbinding portion 2B binds a sheet bundle with the sheet bundle folded into two.

Next, an image forming operation of the copying machine body 1A and a sheet processing operation of the sheet processing apparatus 3 are described below.

When a start button (not shown) is pushed, documents (not shown) stacked on a document tray 129*a* of the document feeder 129 are sequentially conveyed one by one by the document feeder 129 onto the platen glass plate 121. When the document is conveyed, a lamp of the scanner portion 122 is turned on. Also, the scanner unit 123, containing the scanner portion 122, moves to illuminate the document.

Reflected light from the document is input to an image sensor 128 after passing through a lens 127 via mirrors 124 to 126. Input image information is photoelectrically converted by the image sensor 128 into an electrical signal. Subsequently, the electrical signal is subjected to various image processing. The processed signal is input to the image forming portion 100.

According to the present exemplary embodiment, signals (or image data) input to the image forming portion 100 are output from the image reading apparatus 120. However, the signals input to the image forming portion 100 are not limited thereto. Image data transmitted from a personal computer can be employed as the image data input to the image forming portion 100.

The signal input to the image forming portion 100 is converted into an optical signal by an exposure control portion 101. Light represented by the optical signal is irradiated onto the photosensitive drum 102 as irradiation light according to an image signal. Consequently, a latent image is formed on the photosensitive drum 102. Then, the latent image formed with the irradiation light on the photosensitive drum 102 is developed by the developing device 103.

A sheet S accommodated in a sheet feeding cassette 145 is sent out by a sheet feeding roller 146 concurrently with the image forming operation. Subsequently, the sheet S is conveyed to a skew correction portion 110A, in which skew correction on the sheet S is performed. Then, the sheet S is sent to a transfer portion 104 at adjusted timing. Thus, a toner image formed on the photosensitive drum 102 is transferred to the sheet S. After the toner image is transferred to the sheet S, a surface of the photosensitive drum 102 is subjected to a process for removing residual adherents, such as residual toner, with a cleaning unit 106. Thus, the surface of the photosensitive drum 102 is repeatedly used to form images.

Subsequently, the sheet S, onto which the toner image has been transferred, is conveyed to the fixing device 150, in which the transferred image is permanently fixed. Then, the sheet S, to which the image has been fixed, is discharged from the copying machine body 1A by the discharge roller pair 180. The sheet S is subsequently conveyed to the sheet processing apparatus body 3A via the sheet conveyance apparatus 2.

In a case where images are formed on both sides of a sheet S, the sheet S having passed through the fixing portion 150 is reversed by a reversing path 170. Then, the sheet S is conveyed to the image forming portion 100 to form an image on the back surface of the sheet S. Thereafter, the sheet S is conveyed by the discharge roller pair 180 to the sheet processing apparatus body 3A via the sheet conveyance apparatus 2.

At that time, the sheet S having passed through the fixing portion 150 is discharged by the paper discharge roller pair 180 to the sheet processing apparatus body 3A without passing through the reversing path 170, similarly to the case where an image is formed on one side of the sheet S. Consequently, in either a one-sided mode or a two-sided mode, the sheet S is fed to the sheet processing apparatus body 3A so that the second side surface of the sheet S faces upward. In a saddle stitch mode, which will be described later, a two-sided mode can be selected.

In a case where the sheet S is conveyed in the above-described manner, when, for example, a non-sorting mode is selected, the sheet processing apparatus body 3A causes the sheet S sent from the copying machine body 1A to pass from an inlet roller pair 201 to a non-sorting conveyance path 251 via a sorting upstream conveyance path 250. Then, the sheet S is discharged by a non-sorting discharge roller pair 279 to an upper stack tray 280.

When a staple sort processing mode is selected, a switching flapper (not shown) is switched so that the sheet S sent from the copying machine body 1A can be led from the inlet roller pair 201 to a sorting downstream conveyance path 252 via the sorting upstream conveyance path 250.

Then, the sheet S passes through the sorting downstream conveyance path 252 via the switching flapper. Subsequently, the sheet S is discharged by a sorting discharge roller pair 253 to a sheet processing tray 254. Thus, the sheet S discharged to the sheet processing tray 254 is conveyed towards a rear end stopper 255 by its own weight and a paddle 271.

The sheet S conveyed towards the rear end stopper 255 by the paddle 271 contacts the rear end stopper 255, which is provided downstream in a conveying direction of the sheet processing tray 254. Thus, the alignment of the sheet S in the conveying direction is performed. Subsequently, alignment in a width direction is performed by a pair of alignment plates 258. Then, the sheets S sequentially stacked on the sheet processing tray 254 are aligned by the alignment plates 258. Thereafter, a bundle of sheets S is bound by the stapler 257. Subsequently, the bundle of sheets S is discharged to a lower stack tray 281 by a bundle discharge roller pair 270.

In a case where the saddle stitch mode, which is a processing mode in which a sheet bundle is bound, is selected, first, a sheet S discharged from the copying machine body 1A is directed to a saddle stitch path 202 from the inlet roller pair 201 by a switching flapper (not shown). Then, the sheet S is discharged by a discharge roller pair 215 to a saddle stitch alignment portion (hereinafter referred to as an "alignment portion") 203.

The sheet S discharged to the alignment portion 203 stops in a state in which the leading end in the sheet conveying direction of the sheet S contacts a stopper 207. Subsequently, alignment in the width direction of the sheet S is performed by a pair of alignment plates 219 serving as an alignment portion corresponding to a width direction of the sheet S. Then, this operation is performed a number of times corresponding to a set number of sheets of a sheet bundle.

The stopper 207 can be moved upward and downward. When the sheet S is discharged, the stopper 207 stops in a state in which the stopper 207 has been moved upward. When the sheet S is discharged in this manner, the discharge roller pair 215 is located at the left side of the alignment portion 203 so that a subsequent sheet can be discharged to the left side of a sheet previously stacked on the alignment portion 203, as viewed in FIG. 1. The alignment portion 203 is configured to be inclined rightward, as viewed in FIG. 1. Consequently, a discharged sheet is prevented from interfering with sheets having already been stacked on the alignment portion 203.

When the alignment of a set number of sheets is completed in the alignment portion 203, stapling (or binding) is performed on a substantially central portion in the conveying direction of the aligned sheets by the staplers 204, serving as two binding units, in a case where the stapling is set to be performed. The stapler 204 includes a stapler body (not shown) and an anvil portion (not shown), which are disposed at the right side and the left side of the alignment portion 203, respectively, as viewed in FIG. 1, so that staple legs are directed towards the folding roller pair 205.

Upon completion of stapling, the stopper 207 descends by a predetermined distance according to a sheet size. Accordingly, the substantially central portion in the conveying direction of the sheet bundle (or the stapling portion in a case where stapling has been performed) moves to the vicinity of the nip of the folding roller pair 205. Thereafter, a sheet pushing plate 206 is moved towards the nip of the folding roller pair 205. The sheet pushing plate 206 and the folding roller pair 205 constitute a folding portion.

Consequently, the substantially central portion in the conveying direction of the Sheet bundle is pushed to the nip of the folding roller pair 205. Subsequently, the substantially central portion passes through the folding roller pair 205. Accordingly, the sheet bundle is folded into two at the substantially central portion in the conveying direction. Then, the sheet bundle folded into two is discharged, with the fold position in the lead, to a stack tray 220 via the folding roller pair 205 and a guide 222.

A stopper 221, which is slidably movable, is provided on the stack tray 220. The discharged sheet bundles are sequentially stacked on the stack tray 220 while a leading edge of the sheet bundle is regulated by the stopper 221 and slides the stopper 221 in a state in which the sheet bundle contacts the stopper 221. Consequently, the sheet bundles can be stacked on the stack tray 220 without lowering stackability.

Figure 2:
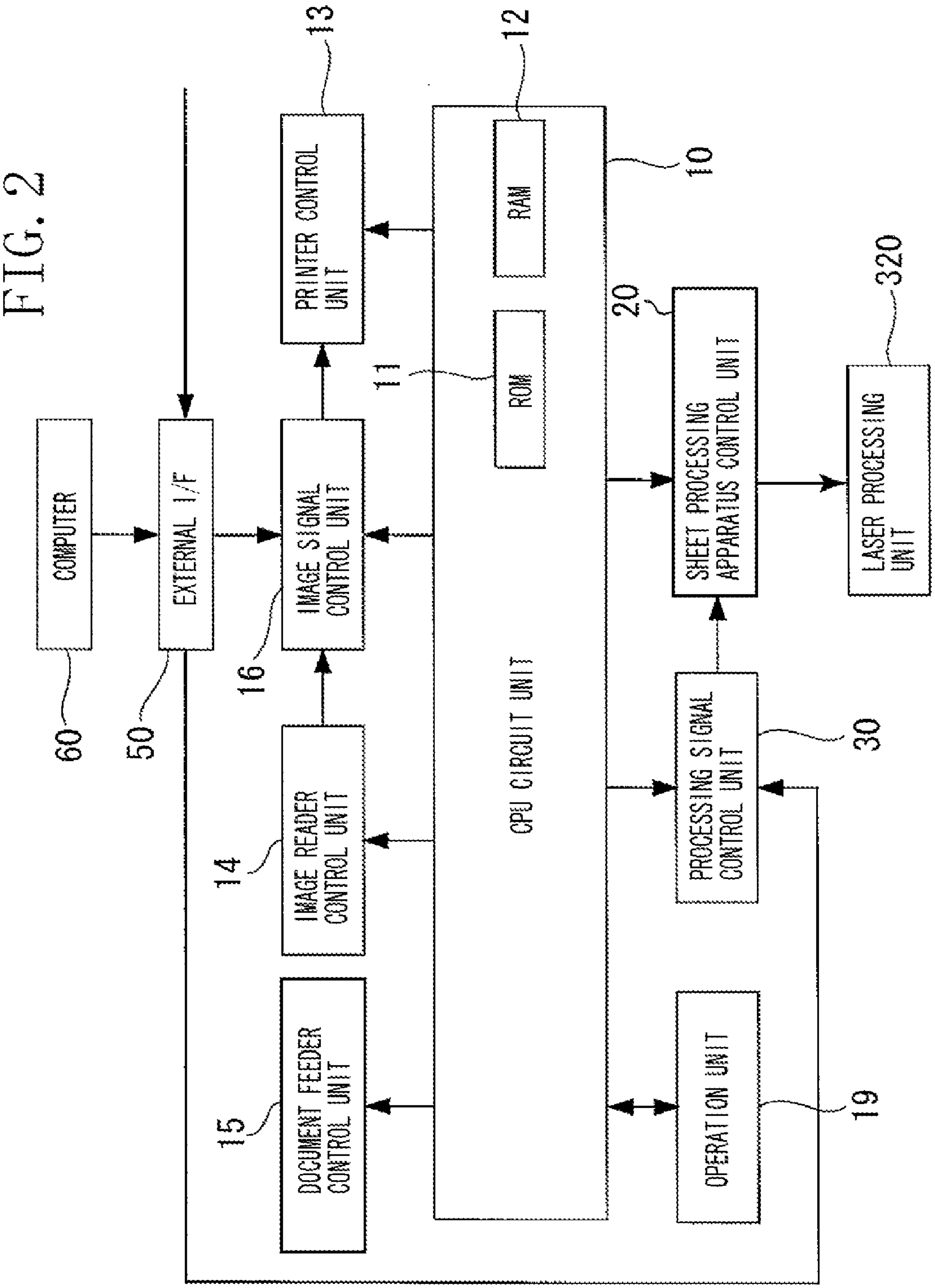
FIG. 2 illustrates a control block diagram of the copying machine according to an exemplary embodiment of the invention.

FIG. 2 illustrates a control block diagram of the copying machine 1. As illustrated in FIG. 2, a central processing unit (CPU) circuit unit 10, constituting a controller, includes a CPU (not shown), a read-only memory (ROM) 11, and a random access memory (RAM) 12. The CPU circuit unit controls a document feeder control unit 15, an image reader control unit 14, and a printer control unit 13 according to a control program stored in the ROM 11. Also, the CPU circuit unit 10 controls an image signal control unit 16, a processing signal control unit 30, and a sheet processing apparatus control unit 20.

The RAM 12 temporarily stores control data and is used as a work area for performing computation to control various units. The document feeder control unit 15 drives and controls the document feeder 129 according to instructions from the CPU circuit unit 10. The image reader control unit 14 drives and controls the scanner unit 123 and the image sensor 128, and transfers an analog image signal output from the image sensor 128 to the image signal control unit 16.

The image signal control unit 16 converts an analog image signal output from the image sensor 128 into a digital signal, and performs various processing on the digital signal after the conversion. Also, the image signal control unit 16 performs various processing on a digital image signal transmitted from a computer 60 via an external interface (I/F) 50. Then, the image signal control unit 16 converts the processed digital image signal into a video signal and outputs the video signal to the printer control unit 13. A processing operation of the image signal control unit 16 is controlled by the CPU circuit unit 10. The printer control unit 13 drives and controls the exposure control portion 101 according to the input video signal.

An operation unit 19 illustrated in FIG. 2 has a plurality of keys for setting various functions relating to image formation and a display portion for displaying information indicating a set condition. The operation unit 19 outputs to the CPU circuit unit 10 a key signal corresponding to an operation on each key. Also, the operation unit 19 displays, on the display portion, information corresponding to a signal output from the CPU circuit unit 10.

The processing signal control unit 30 performs various processing on a digital processing signal input from the computer 60 via the external I/F 50. Then, the processing signal control unit 30 converts the digital processing signal into a video signal, and outputs the video signal to the sheet processing apparatus control unit 20. A processing operation of the processing signal control unit 30 is controlled by the CPU circuit unit 10.

The sheet processing apparatus control unit 20 is mounted in the sheet processing apparatus 3 and drives and controls the sheet processing apparatus 3, including the laser processing unit 320, by exchanging information with the CPU circuit unit 10 of the copying machine body 1A. When a video signal is input from the processing signal control unit 30 to the sheet processing apparatus control unit 20, the sheet processing apparatus control unit 20 drives the laser processing unit 320 according to the video signal or according to sheet information on the thickness and stiffness of sheets or the number of sheets, which is output from the operation unit 19. Alternatively, the CPU circuit unit 10 of the copying machine body 1A can directly control an operation of the laser processing unit 320.

In a case where the saddle stitch mode is selected in the present exemplary embodiment, when a sheet S is conveyed to the sheet conveyance apparatus 2 from the copying machine body 1A, the sheet S is conveyed by the inlet roller 301 and conveyance roller pairs 302 and 303 and reversed by the sheet reversing portion 310. Subsequently, the sheet S is conveyed to the sheet processing apparatus body 3A by a reversing roller pair 304 and a discharge roller pair 305.

If the sheet edge detection sensor 340 detects a leading edge of the sheet S passing through the sheet conveying apparatus 2, the sheet processing apparatus control unit 20 drives the laser processing unit 320 based on a detection signal output from the sheet edge detection sensor 340.

Figure 3A:
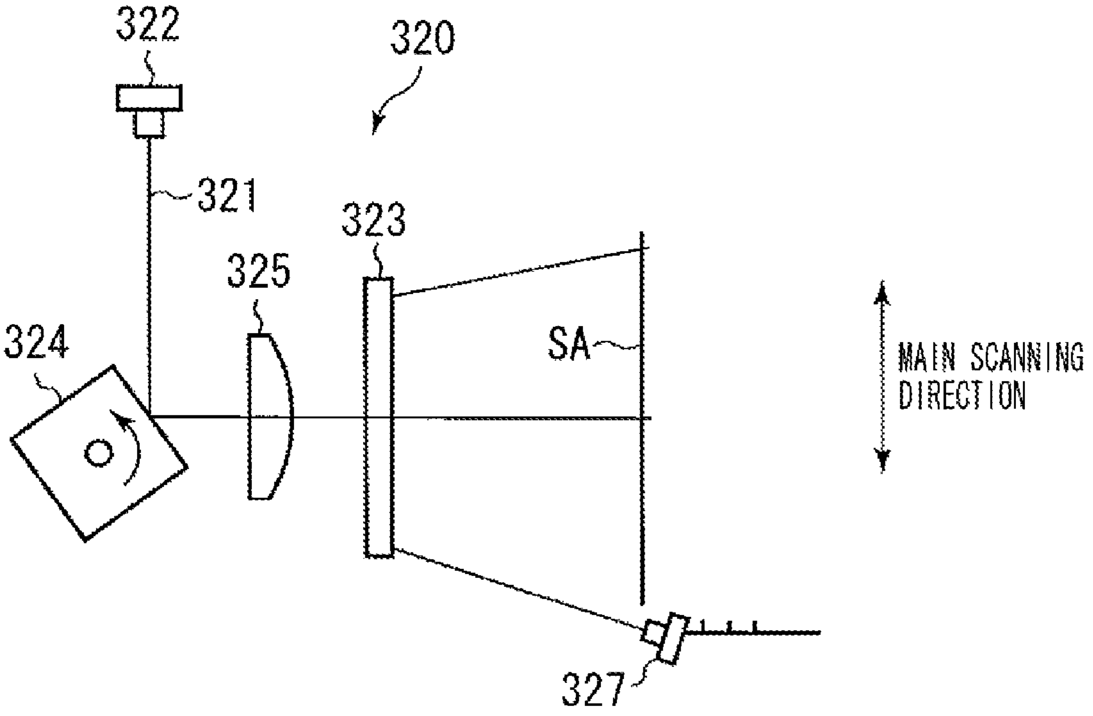
FIGS. 3A and 3B illustrate a laser processing unit of the sheet processing apparatus according to an exemplary embodiment of the invention.
Figure 3B:
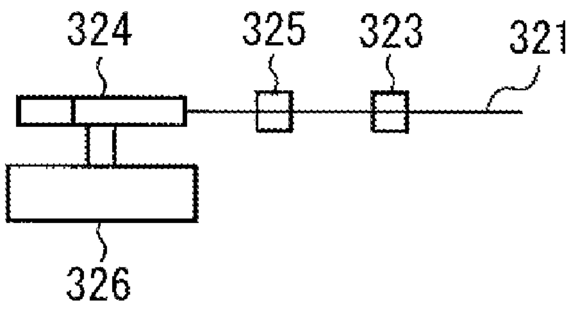

FIGS. 3A and 3B illustrate a configuration of the laser processing unit 320. FIG. 3A is a plan view of the laser processing unit 320. FIG. 3B is a cross-sectional view of the laser processing unit 320.

The laser processing unit 320 includes a polygonal mirror 324, a polygonal mirror drive motor 326 for rotationally driving the polygonal mirror 324, a laser diode 322 serving as a light source, a beam detection (BD) sensor 327, and lenses 325 and 323.

The laser diode 322 is turned on and off by a drive circuit (not shown) according to a processing shape. A laser beam 321 emitted from the laser diode 322 is first irradiated onto the polygonal mirror 324 rotating in the direction of an arrow illustrated in FIG. 3A.

The laser beam 321 irradiated onto the polygonal mirror 324 is reflected by a reflection surface of the polygonal mirror 324 as a deflecting beam that continuously changes a deflection angle. Subsequently, the reflection light beam undergoes distortion aberration correction by the lenses 325 and 323. Then, the light beam scans the surface of the sheet S, which passes through the sheet conveyance apparatus 2 in the sheet conveying direction (i.e., an auxiliary scanning direction), in a main scanning direction perpendicular to the sheet conveying direction.

One surface of the polygonal mirror 324 corresponds to the scanning of one line. The laser beam 321 emitted from the laser diode 322 scans the surface of the sheet S line by line according to the rotation of the polygonal mirror 324. In the present exemplary embodiment, a quadruple mirror is used as the polygonal mirror 324. Alternatively, the polygonal mirror 324 can have a different number of surfaces.

The BD sensor 327 is disposed in the vicinity of a scanning start position on the side of the sheet S. The laser beam 321 reflected from each reflection surface of the polygonal mirror 324 is detected by the BD sensor 327 before scanning each line. A BD signal output from the BD sensor 327 is used as a scanning start reference signal in the main scanning direction. Alignment of an irradiation start position in the main scanning direction of each line is performed based on the scanning start reference signal.

In the present exemplary embodiment, when the sheet S passes through the sheet conveyance apparatus 2, the laser processing unit 320 is driven to irradiate a laser beam onto a middle position of a length in the conveying direction of the sheet S, which corresponds to a fold position of the sheet S.

Consequently, the entire range in a direction perpendicular to the sheet conveying direction (hereinafter referred to as a width direction) of the middle portion of the sheet S, onto which the laser beam is irradiated, is laser-processed at a predetermined width and at a predetermined depth.

Figure 4:
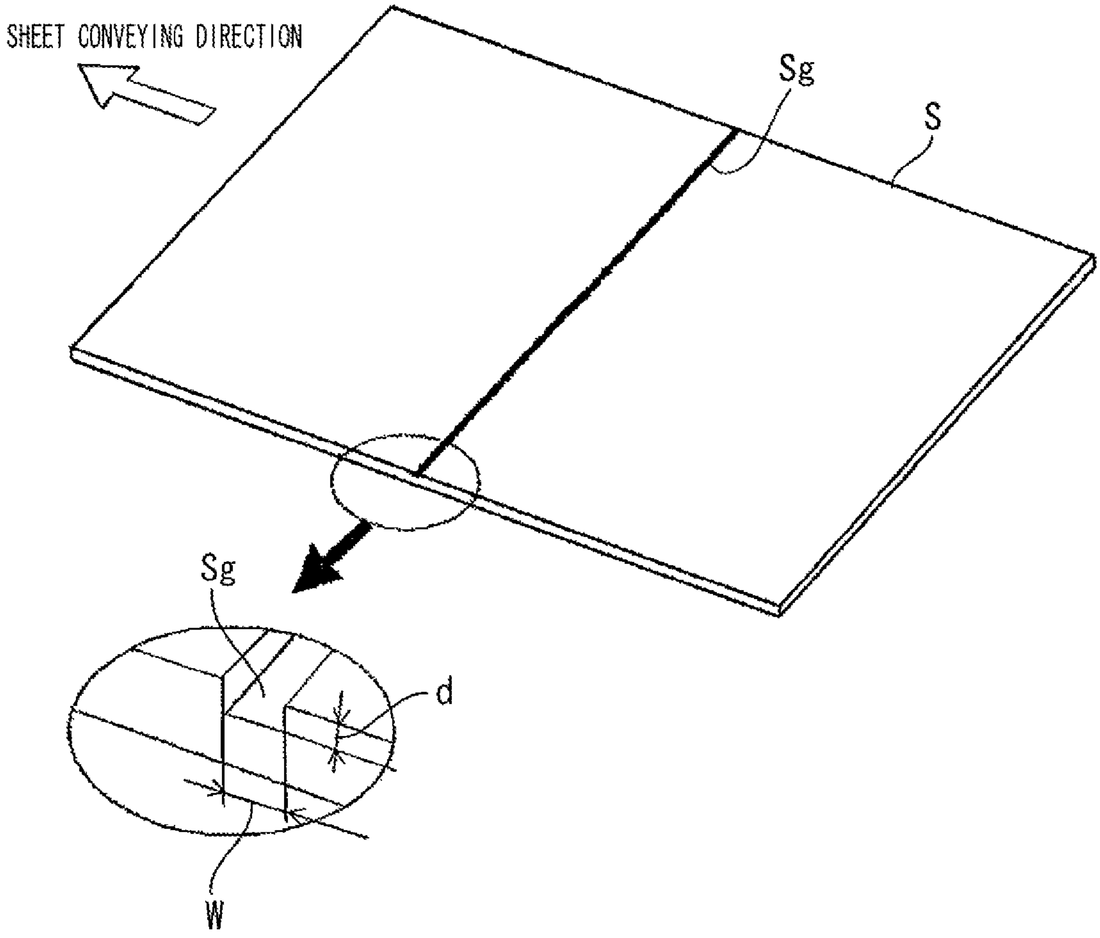
FIG. 4 is a perspective view illustrating a sheet laser-processed by the laser processing unit according to an exemplary embodiment of the invention.

Consequently, as illustrated in FIG. 4, a single groove Sg, which has a predetermined width W in the sheet conveying direction and a predetermined depth d, is formed over the entire range in the width direction of the middle portion of the sheet S. The formation of the groove Sg results in a reduction in the thickness of the groove-formed portion of the sheet S in the fold position.

According to the present exemplary embodiment, a spot of the laser beam 321 is shaped as an ellipse which is about 90 μm in major axis length and about 60 μm in minor axis length. The minor axis direction of the ellipse agrees with the main scanning direction. Accordingly, the width in the sheet conveying direction (i.e., the auxiliary scanning direction) of one scanning line is about 90 μm.

In the present exemplary embodiment, a width of a portion in which the thickness of the sheet S is reduced, i.e., the width W of the groove Sg, is set at about 450 μm, which is larger than the width of one scanning line. In a case where the groove Sg, which is wider than one scanning line, is formed, laser beams are irradiated a plurality of times. At that time, the laser beams are required to overlap in the line width direction. In the present exemplary embodiment, an amount of overlap of the laser beams is set at about 30 μm.

Additionally, according to the present exemplary embodiment, a carbon dioxide ($CO_2$) laser is used with the laser diode 322. A reduction in the thickness of the sheet S, which is caused by performing laser processing in the direction of one scanning line, i.e., the depth d of the groove Sg, is set to be within a range from 30 μm to 100 μm by adjusting an output of the laser diode 322.

This range is determined according to the thickness of a sheet set via the operation unit 19 of the copying machine 1. In a case where the sheet is plain paper, the depth d is set at about 30 μm. In a case where the sheet is thick paper with a maximum thickness set to have a grammage of 200 g/m$^2$, the depth d is set at about 100 μm. This setting allows the sheet to maintain the break resistance of the sheet.

The value of the reduction in the thickness of the sheet and the type of the laser can optionally be changed. Alternatively, a user can be allowed to adjust the value of the reduction in the thickness of the sheet according to the thickness of the sheet. Although laser beams are caused by the polygonal mirror 324 to scan the surface of the sheet S in the main scanning direction in the present exemplary embodiment, a laser unit itself can be made to scan the sheet S in the main scanning direction.

After the thickness of the middle portion in the sheet conveying direction of the sheet S is reduced by forming the groove Sg thereon when the sheet S passes through the sheet conveyance apparatus 2, the sheet S is conveyed to the sheet processing apparatus body 3A. Thus, the sheets S are sequentially conveyed to the sheet processing apparatus body 3A, so that a sheet bundle is formed. Subsequently, as described above, the sheet bundle is subjected to processing, such as stapling. Thereafter, the sheet bundle is pushed by the sheet pushing plate 206 into the nip portion of the folding roller pair 205, so that the sheet bundle is folded into two at the substantially central portion in the sheet conveying direction. Then, the sheet bundle folded in this manner is discharged to the stack tray 220 via the folding roller pair 205 and the guide 222.

Figure 5:
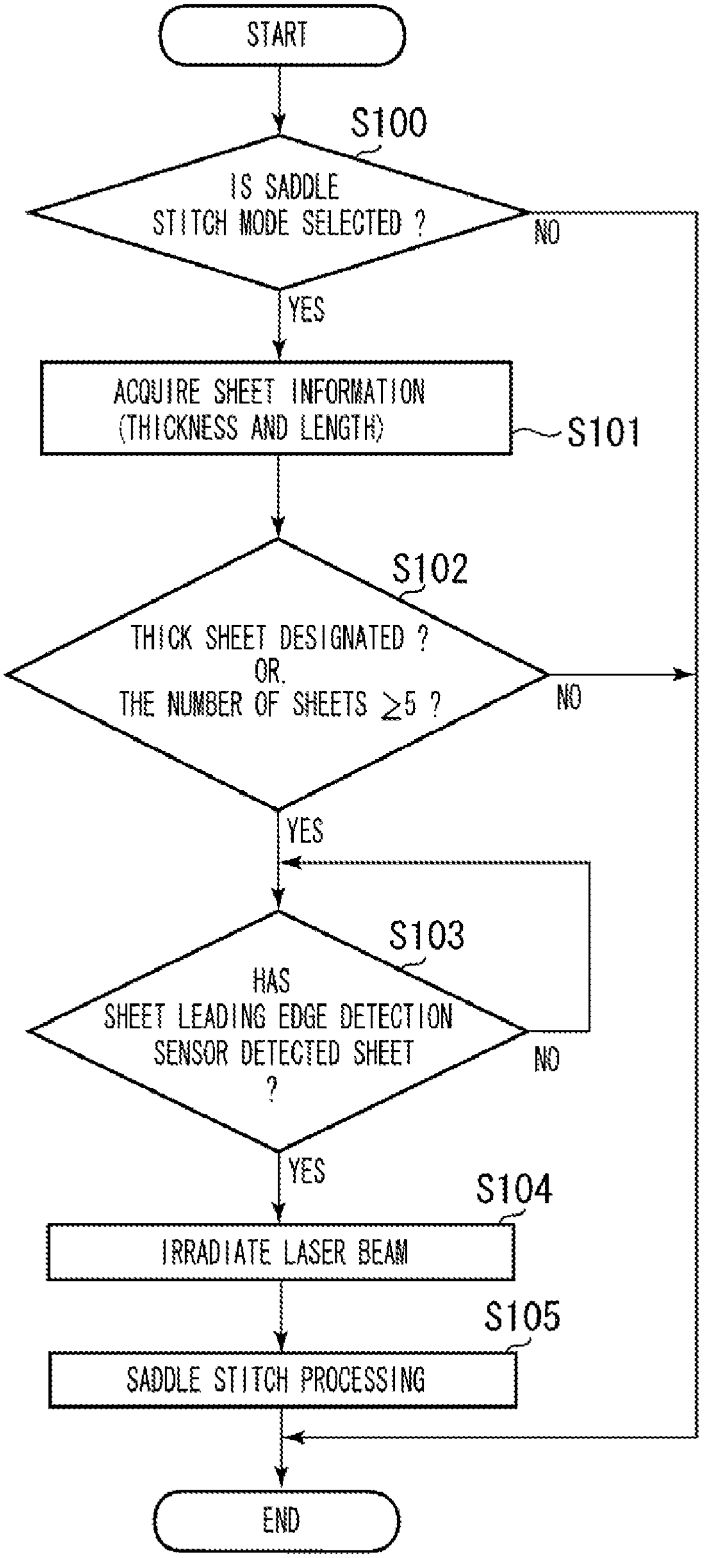
FIG. 5 is a flowchart illustrating laser processing performed on a sheet by the sheet processing apparatus according to an exemplary embodiment of the invention.

Next, laser processing performed on a sheet by the laser processing unit 320 is described below with reference to a flowchart illustrated in FIG. 5.

First, in step S100, the CPU circuit unit 10 of the copying machine body 1A determines whether a user has selected the saddle stitch mode via the operation unit 19. If the saddle stitch mode is selected (YES in step S100), processing proceeds to step S101. If the saddle stitch mode is not selected (NO in step S100), processing ends. In step S101, the CPU circuit unit 10 acquires sheet information on the thickness and length of the sheet.

Next, in step S102, the CPU circuit unit 10 determines whether the sheet is thick paper or whether the number of sheets is equal to or greater than a predetermined number (e.g., 5). The CPU circuit unit 10 drives the laser processing unit 320 via the sheet processing apparatus control unit 20 according to a result of the determination in step S102.

In the present exemplary embodiment, if the CPU circuit unit 10 determines that the thickness of a front cover is equal to or greater than a predetermined value, for example, a grammage of 128 g/m$^2$, or that the number of sheets of a sheet bundle is equal to or greater than 5 (YES in step S102), processing proceeds to step S103 to allow the CPU circuit unit 10 to drive the laser processing unit 320. If the CPU circuit unit 10 determines that the thickness of a front cover is less than a grammage of 128 g/m$^2$ or that the number of sheets of a sheet bundle is less than 5 (NO in step S102), processing ends. Thus, in a case where the CPU circuit unit 10 determines, based on the thickness of the sheet or the number of sheets, that the sheets can be sufficiently folded, the formation of a groove on the sheet is made to be unnecessary, thus reducing a time required for bookbinding.

Next, if the sheet edge detection sensor 340 detects a leading edge of a sheet (YES in step S103), the CPU circuit unit 10 starts, for example, a timer (not shown) in response to a signal sent from the sheet edge detection sensor 340. Thus, the CPU circuit unit 10 measures timing at which the middle portion of the sheet reaches a laser beam irradiation position.

Then, if the CPU circuit unit 10 determines, based on a count by the timer, that the middle portion of the sheet has reached the laser beam irradiation position, the CPU circuit unit 10 drives the laser processing unit 320 to irradiate a laser beam in step S104. Consequently, the groove Sg for folding the sheet is formed in the middle portion of the sheet. Then, in step S105, the CPU circuit unit 10 performs the saddle stitch processing.

Figure 6:
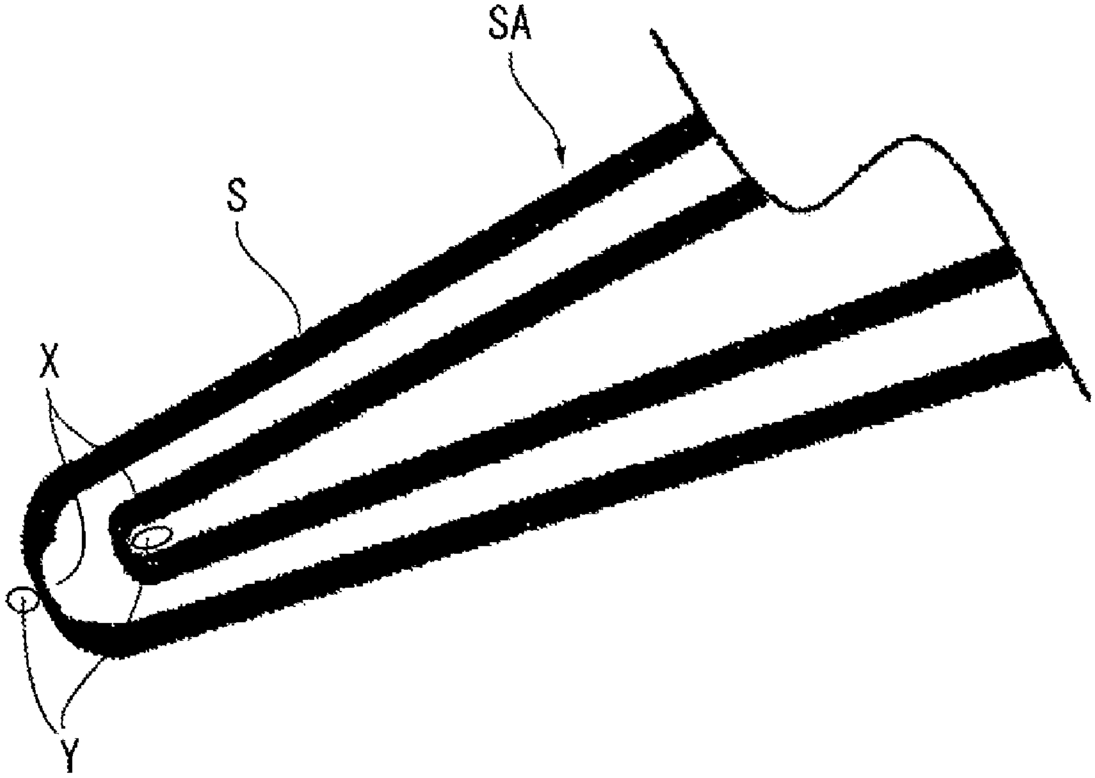
FIG. 6 is a cross-sectional view illustrating a middle portion of a sheet bundle obtained by folding into two a bundle of sheets that are laser-processed by the laser processing unit according to an exemplary embodiment of the invention.

FIG. 6 is a cross-sectional view of the middle portion of a sheet bundle SA in a case where sheets S, in each of which the groove Sg is formed in the middle portion X thereof to reduce the thickness of the middle portion X via the laser processing unit 320, are formed into the sheet bundle SA and where the sheet bundle SA is folded into two while being bound with staples Y. As is understood from FIG. 6, the thicknesses of the middle portions X of the sheets S of the sheet bundle SA are reduced.

The reduction in the thickness of the fold portion of the sheet bundle SA results in a decrease in the stiffness of the sheets. The folding of the sheet bundle is sufficiently achieved as compared with a case where the thickness of the fold portion is not reduced. Thus, the sheet bundle SA becomes unlikely to unfold. Consequently, a resultant product, i.e., the appearance of the bound sheet bundle SA, can be enhanced. Additionally, the stackability thereof can be enhanced because the sheet bundle SA is unlikely to unfold.

Particularly, in a case where a thick sheet is used as a front cover, an amount of elongation of a sheet surface due to the folding of the sheet is small. Thus, in a case where a toner layer is formed on the surface of the sheet used as a front cover, the toner layer can be prevented from peeling from the sheet. Consequently, the appearance of the front cover can be enhanced.

As described above, the laser processing unit 320 forms the groove Sg on the sheet S to fold the sheet S according to the sheet information. Consequently, the sheet bundle SA can be made unlikely to unfold. Additionally, the sheet bundle SA can be bound in a good appearance.

Thus, a fold portion of the sheet S can be preliminarily made by the laser processing part 320 to be thin. Consequently, the saddle-stitched sheet bundle SA can be prevented from unfolding. Accordingly, a sheet bundle SA having a reduced amount of unfolding in a good appearance can be obtained. Additionally, sheet bundles SA having a reduced amount of unfolding in a good appearance can be stacked. Thus, the stackability of the sheet processing apparatus body 3A can be enhanced. Also, even in a case where the front cover is thick, an amount of elongation of the toner layer formed on the front cover can be decreased by reducing the thickness of the fold portion. Consequently, an amount of toner peeling from the fold line of the thick sheet can be reduced.

First Exemplary Embodiment

In the foregoing description, the width and depth of the groove Sg formed on the sheet S are set uniform corresponding to each of the sheets according to the sheet information. Thus, with an increase in the thickness of the sheet bundle SA, the outer the sheet of the sheet bundle SA is located, the more difficult the folding of the sheet is. To solve this problem, it is useful to control an operation of the laser processing unit 320 such that the width of the groove Sg varies with each sheet or with each a plurality of sheets according to the thickness of the sheet S or the number of sheets S.

Thus, the stiffness of the outer sheet of the sheet bundle SA can be reduced by changing the width of the groove Sg according to the sheet information. Consequently, the outer sheet of the sheet bundle SA can easily be folded. Accordingly, the sheet bundle SA is more unlikely to unfold. Additionally, the sheet bundle SA can be bound in a good appearance.

Figure 8:
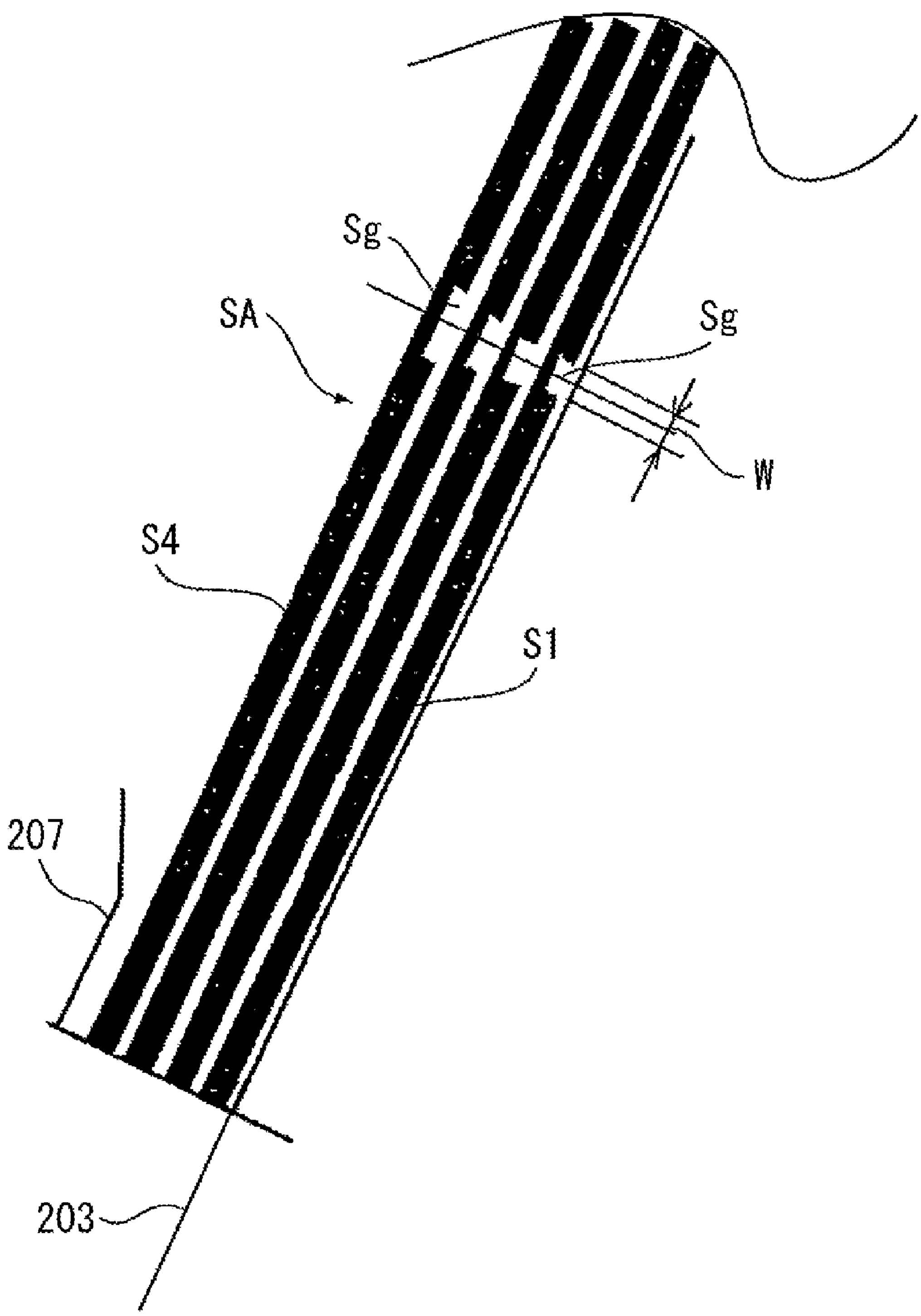
FIG. 8 illustrates a state in which sheets laser-processed by the laser processing unit are stacked on an alignment portion according to an exemplary embodiment of the invention.

FIG. 8 illustrates a state in which the sheets S each having the groove Sg, whose widths W vary according to the number of sheets, are stacked on the alignment portion 203. In this case, the width W of the groove Sg is set such that the width W of the groove Sg gradually increases from the first innermost sheet S1 of the sheet bundle SA towards the outermost sheet S4 as viewed when the sheet bundle SA is folded into two.

More specifically, the width W of the groove Sg is set such that the width W of the groove Sg of the sheet S4, which is outer-located in the sheet bundle SA and has a larger radius of curvature of the fold portion as the thickness of the sheet bundle SA increases, is wider than the width W of the groove Sg of the inner-located sheet S1. Thus, the stiffness of the outer sheet of the sheet bundle is reduced. Consequently, the outer sheet of the sheet bundle SA can easily be folded. Accordingly, the sheet bundle SA folded into two is more unlikely to unfold. Additionally, a radius of curvature of the fold portion can be prevented from increasing. Thus, the appearance of a resultant sheet bundle can be improved. The stackability can also be enhanced.

In a case where the number of sheets S is large, it is useful to set the width W of the groove Sg as follows. For example, the width W of the groove Sg corresponding to each of the first to fifth sheets is about 450 μm. The width W of the groove Sg corresponding to each of the sixth to tenth sheets is about 900 μm. The width W of the groove Sg corresponding to each of the eleventh to fifteenth sheets is about 1350 μm. In this case, the width W of the groove Sg can be linearly changed. Alternatively, first, the maximum value and the minimum value of the width W of the groove Sg are set. Then, the width W of the groove Sg can be linearly changed. Thus, the width W of the groove Sg can be changed for each sheet or for each a plurality of sheets such that the width W of the groove Sg of the innermost sheet S1 has a minimum value and the width W of the groove Sg of the outermost sheet S4 has a maximum value.

An amount of change, a maximum value, and a minimum value of the width W of the groove Sg are changed according to sheet information on the thickness of each sheet S of the sheet bundle SA or the number of sheets S of the sheet bundle SA. The width W of the groove Sg is set such that the lengths of curved portions of sheets of the sheet bundle SA are equal to one another and that the centers of the curved portions of the sheets coincide with one another. Thus, the appearance of the resultant sheet bundle can be enhanced. However, a change in the width W for each sheet is very small. Thus, the width W can be changed for each a plurality of sheets.

The depth of the groove Sg can be changed according to the sheet information on the thickness of each sheet S of the sheet bundle SA or the number of sheets of the sheet bundle SA. The depth of the groove Sg preliminarily set according to the same sheet information is uniform among the sheets. Such setting is required to maintain the break resistance of the sheet.

In the foregoing description, a case in which sheet thickness information is input via the operation unit 19 has been described. The present invention can be applied to another case. For example, the present invention can be applied to a case where a detection portion for detecting the thickness of the sheet is provided upstream of the laser processing unit 320 and an operation of the laser processing unit 320 is controlled based on information output from the detection portion.

Such a detection portion can be configured by enabling one roller of the conveyance roller pair 302 (see FIG. 1) provided upstream of the laser processing unit 320 to move upward and downward and measuring a distance, by which the one roller of the conveyance roller pair 302 moves when the sheet passes through the conveyance roller pair 302, to detect the thickness of the sheet.

In the foregoing description, an operation of the laser processing unit 320 is controlled based on information on the thickness of each sheet or the number of sheets. Alternatively, an operation of the laser processing unit 320 can be controlled according to an instruction from the operation unit 19.

Alternatively, an operation of the laser processing unit 320 can be controlled based on data stored in a database, which indicate the relationship among the material (type), the grammage, and the stiffness (e.g., Gurley stiffness) of a sheet. For example, the laser processing unit 320 can be driven when the Gurley stiffness is determined to be equal to or greater than 6 Nm according to information indicating the material and the grammage of a sheet and according to data stored in the database.

In the foregoing description, as illustrated in FIG. 4, the middle portion in the conveying direction of a sheet to be saddle-stitched is reduced in thickness over the entire width thereof. However, the present invention can be applied to another configuration.

Figure 7:
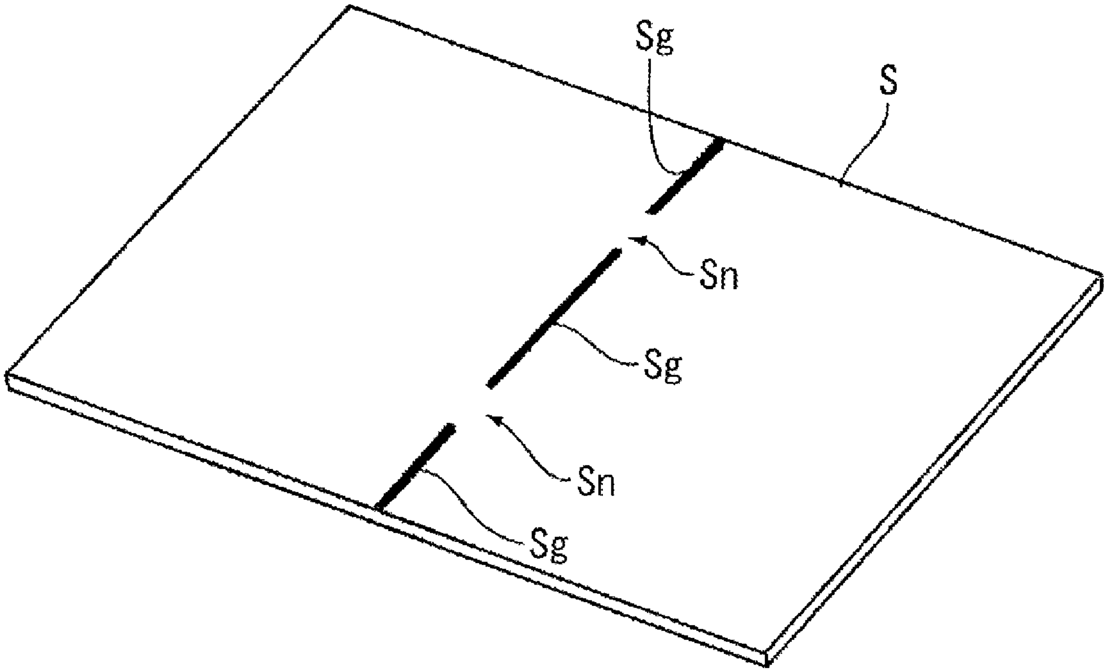
FIG. 7 is a perspective view illustrating a sheet laser-processed by the laser processing unit according to an exemplary embodiment of the invention.

For example, portions Sn, on each of which stapling (or binding) is performed (in the present exemplary embodiment, portions Sn each corresponding to the width of the staple plus 3 mm at both sides of the staple), at the central portion of the sheet S illustrated in FIG. 7 can be adapted so that the reduction in thickness of the sheet is not performed. More specifically, an operation of the laser processing unit 320 can be controlled to form the groove Sg in a portion other than the portions Sn, on each of which the binding of the sheet S is performed. Consequently, the break resistance of the stapled portion can be prevented from being reduced. Also, for example, when cutting holes at predetermined intervals, namely, perforating process is performed, a similar effect will be given.

Figure 9:
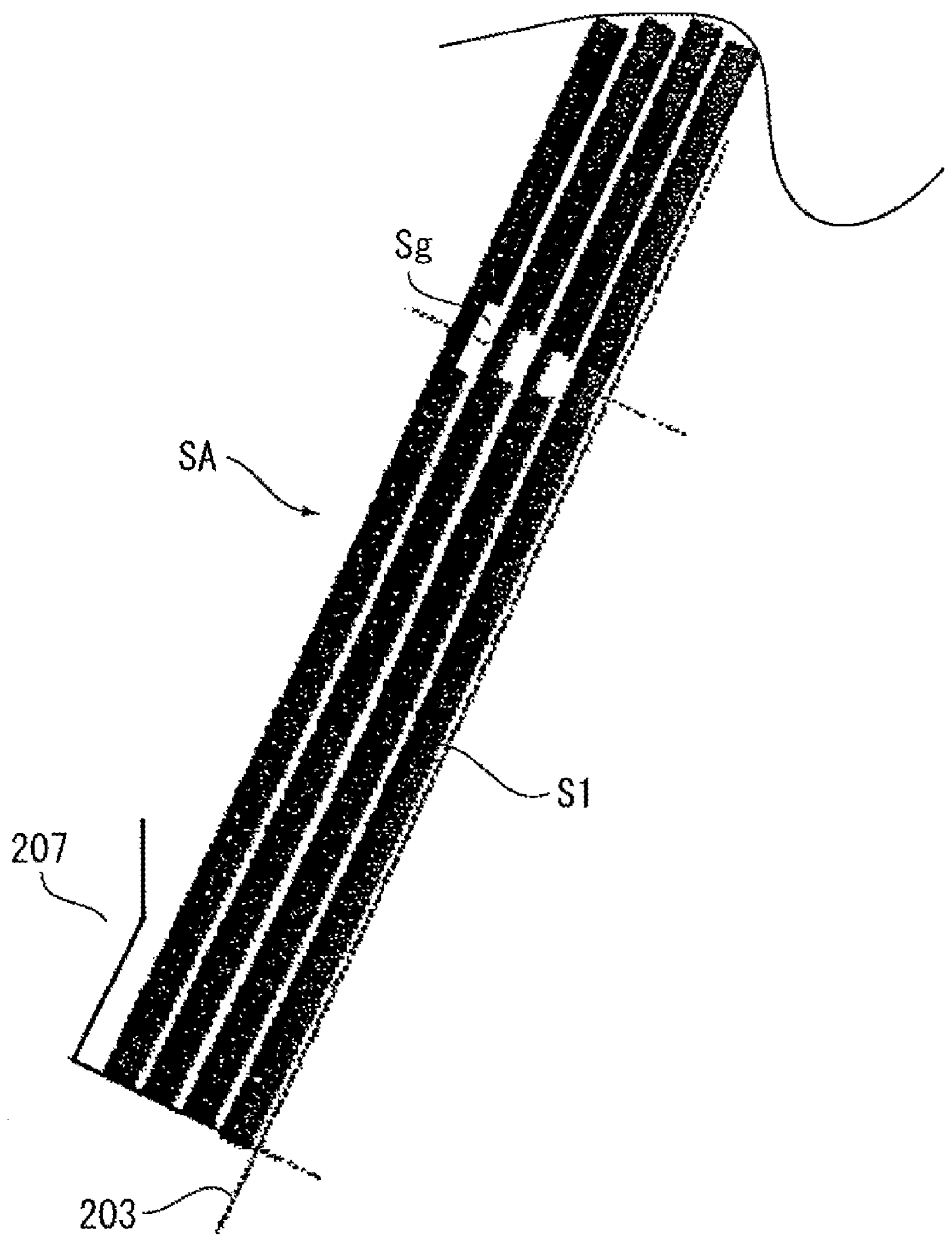
FIG. 9 illustrates a state in which sheets laser-processed in a different manner by the laser processing unit are stacked on the alignment portion according to an exemplary embodiment of the invention.

Additionally, in the foregoing description, the thickness of the sheet is reduced for all of the sheets to be saddle stitched, as illustrated in FIG. 8. However, as illustrated in FIG. 9, the configuration can be arranged such that the reduction in thickness is not performed on the innermost sheet (i.e., the first sheet) of the sheet bundle to be saddle stitched. Consequently, when the sheet bundle SA is unfolded, no portion in which the thickness of the sheet is reduced by the laser processing unit 320 appears in the unfolded sheet bundle SA. Accordingly, the appearance of the sheet bundle SA can be improved.

Second Exemplary Embodiment

Figure 10A:
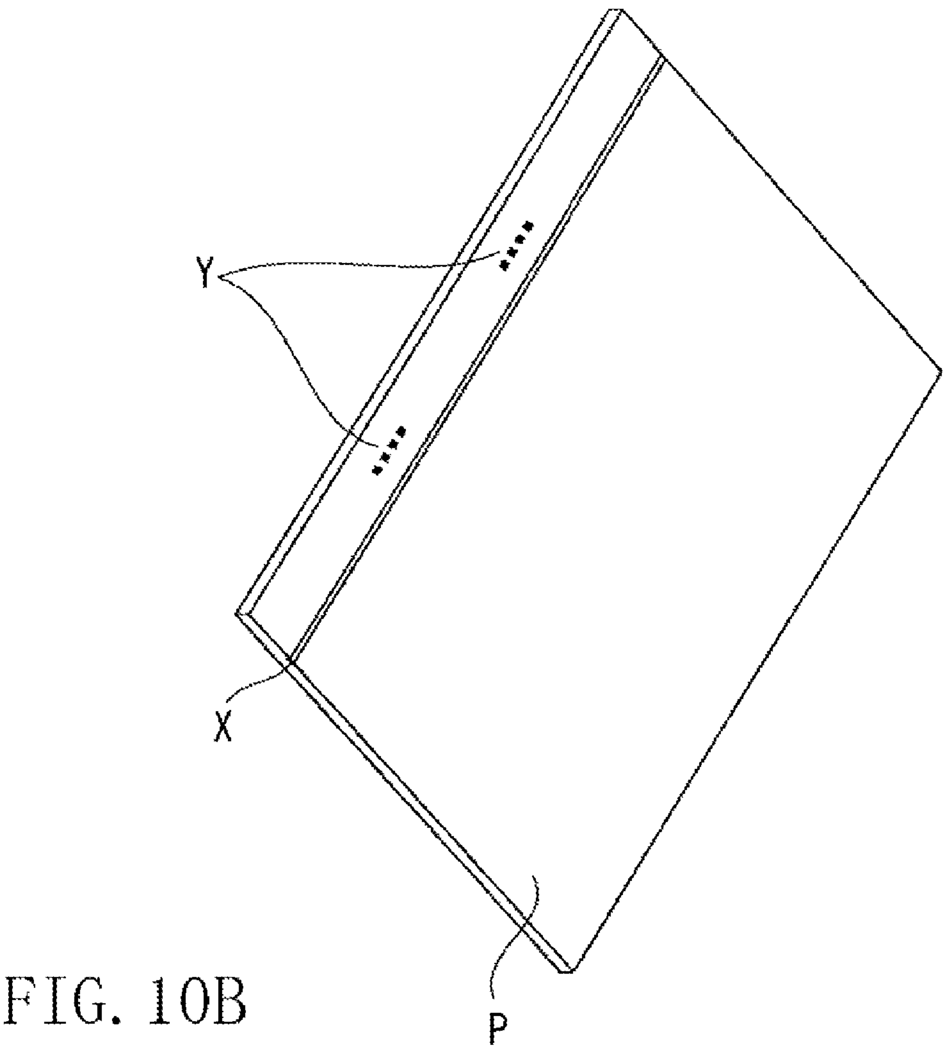
FIGS. 10A and 10B are perspective views illustrating a sheet on which a groove is formed by the sheet processing apparatus according to an exemplary embodiment of the invention.
Figure 10B:
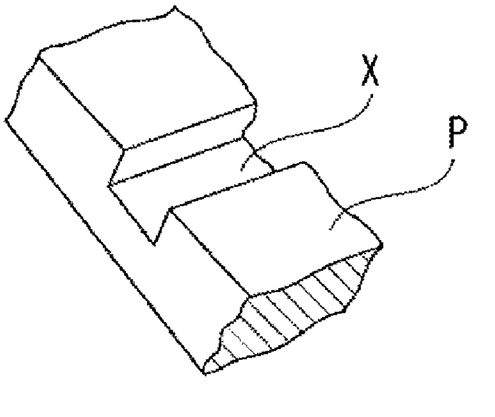

According to a second exemplary embodiment of the present invention, a sheet processing apparatus 3 includes a sheet processing apparatus body 3A that performs binding and punching on a sheet P, and a sheet conveyance apparatus 2, which is provided between the sheet processing apparatus body 3A and a copying machine body 1A and has a laser processing unit 320. As illustrated in FIGS. 10A and 10B, the sheet conveyance apparatus 2 is configured such that a groove X for folding is formed on the sheet P with laser beams. The sheet processing apparatus body 3A is configured to bind the sheets, on each of which the groove X is formed by the sheet conveyance apparatus 2, into a bundle.

Figure 11A:
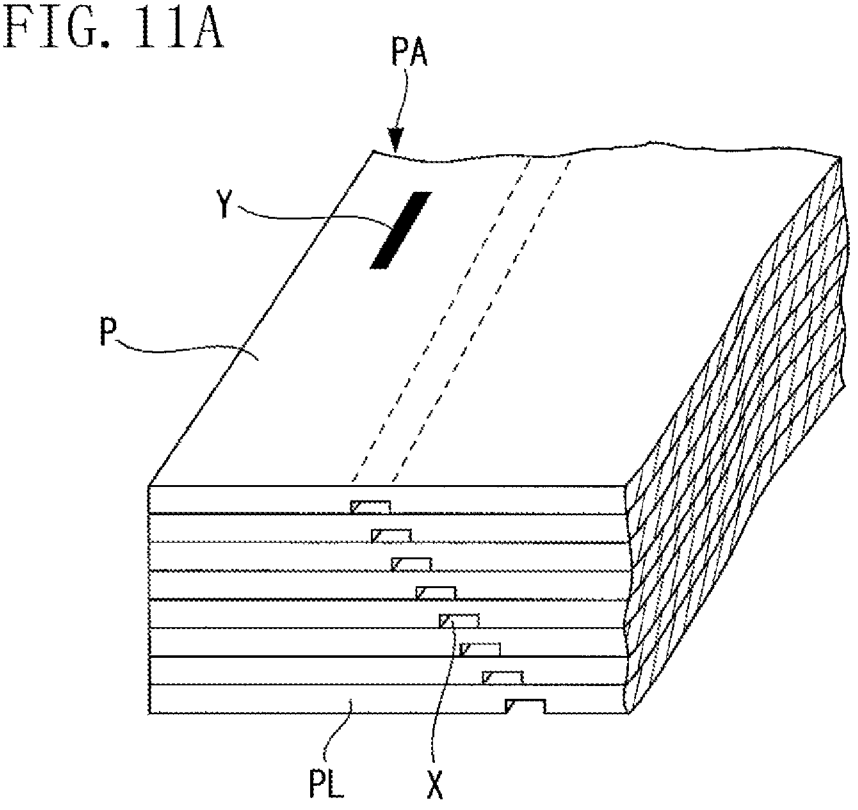
FIGS. 11A and 11B are perspective views illustrating a bundle of sheets on each of which a groove is formed by the sheet processing apparatus according to an exemplary embodiment of the invention.

FIG. 11A is a perspective view illustrating a sheet bundle PA on which two-position binding is performed although illustrating only one position at which binding is performed. The staple Y of a stapler 257 (FIG. 1) for stapling the sheet bundle PA is parallel to an edge of the sheet P. A distance between the staple Y and the edge of the sheet P ranges from about 3 mm to about 5 mm and can be adjusted according to an instruction from the operation unit 19 of the copying machine 1. The groove X is formed in a range of a distance in an inward direction of the sheet P with respect to the position of the staple Y, which ranges about 2 mm to about 10 mm. The middle value of this distance is about 5 mm.

Figure 11B:
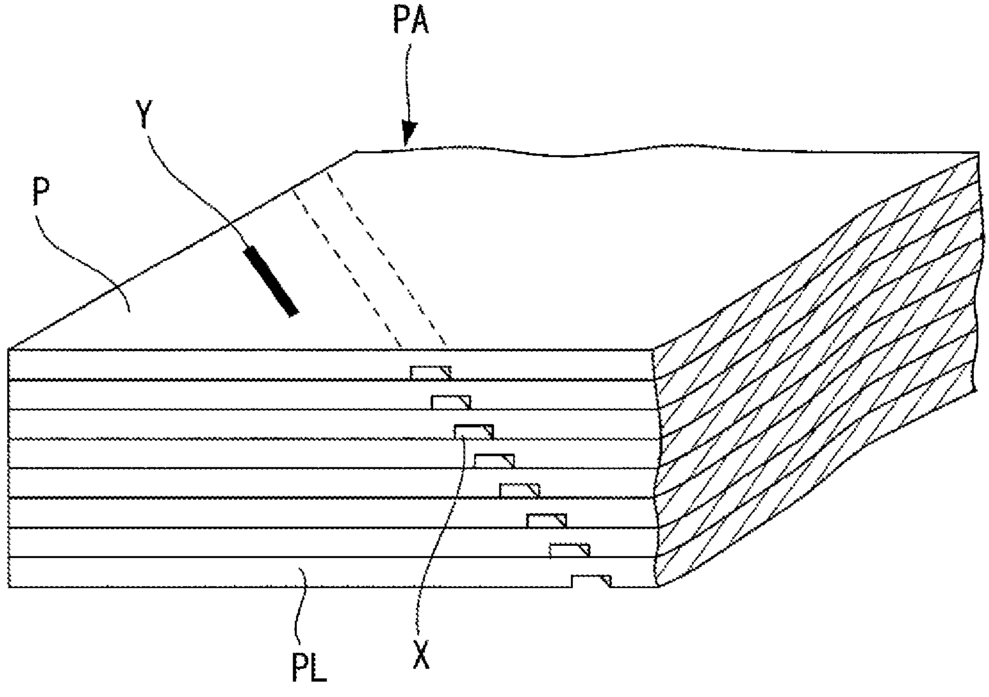

FIG. 11B is a perspective view of a sheet bundle PA on which one-position corner binding is performed. The staple Y binds a corner portion of the sheet bundle PA at an angle of 45 degrees with respect to an edge of the sheet bundle PA. The groove X is formed in parallel to the staple Y within a range of a distance in an inward direction of the sheet P with respect to the position of the staple Y, which ranges about 2 mm to about 10 mm. The middle value of this distance is about 5 mm.

The groove X is formed on each sheet P while shifting the position thereof from the above-described set position in a direction away from the staple Y according to the thickness of the sheet P. For example, in a case where plain paper (a thickness ranges from about 80 μm to about 100 μm, and a grammage ranges from about 64 g/$m^2$ to about 127 g/$m^2$) is used, the position of the groove X is shifted about 100 μm. In a case where thick paper 1 (a thickness ranges from about 100 μm to about 125 μm, and a grammage ranges from about 128 g/$m^2$ to about 156 g/$m^2$) is used, the position of the groove X is shifted about 150 μm. Also, in a case where thick paper 2 (a thickness ranges from about 125 μm to about 200 μm, and a grammage ranges from about 157 g/$m^2$ to about 209 g/$m^2$) is used, the position of the groove X is shifted about 200 μm.

The position of the groove X is set at a place to prevent a portion of the sheet P between a hole formed by the staple Y and the groove X from being lowered in strength to be broken.

The depth DP (FIG. 13) of the groove X can be controlled by employing a $CO_2$ laser as a source of laser beams LB and adjusting an output of the laser. The depth DP of the groove X ranges from, for example, about 30 μm to about 100 μm. The depth DP of the groove X is automatically determined when the type and thickness of the sheet P are input to the operation unit 19 of the copying machine 1. In a case where plain paper is used, the depth DP is about 30 μm. In a case where thick paper with a maximum thickness having a grammage of 200 g/$m^2$, the depth DP is about 100 μm. The source of laser beams LB is not limited to a $CO_2$ laser.

The laser processing unit 320 serving as a sheet processing portion according to the present embodiment uses the polygonal mirror 324 to cause the laser beam LB to scan a sheet in the main scanning direction. However, the sheet processing apparatus 3 can be arranged such that at least one of the laser processing unit 320 and the sheet is moved in the main scanning direction to form a groove in the main scanning direction. Although the depth of the groove is changed by adjusting an output of the laser, the depth of the groove can be controlled, without adjusting an output of the laser, by moving at least one of the laser processing unit 320 and the sheet to adjust an opposing distance between the laser processing unit 320 and the sheet.

A non-sorting operation of the sheet processing apparatus 3 is described below. As illustrated in FIG. 1, the sheet processing apparatus 3 conveys a sheet using the inlet roller pair 301, the conveyance roller pairs 302 and 303, the discharge roller pair 305, and the inlet roller pair 201. Then, the sheet processing apparatus 3 causes a flapper (not shown) to guide the sheet. Subsequently, the sheet is conveyed via a sorting upstream conveyance path 250 and a non-sorting conveyance path 251. Then, the sheet is discharged by a non-sorting discharge roller pair 279 to the upper stack tray 280.

A sorting operation of the sheet processing apparatus 3 is described below. The sheet processing apparatus 3 guides a sheet, which has been conveyed to the inlet roller pair 201, to the sorting upstream conveyance path 250 and a sorting downstream conveyance path 252. Then, the sheet is discharged by a sorting discharge roller pair 253 to the sheet processing tray 254. The sheet processing tray 254 is configured such that a portion thereof at the side of a sheet rear end regulating member 255 is inclined downward about 35 degrees so that the sheet can contact the sheet rear end regulating member 255. The sheet slides downward along the sheet processing tray 254 and contacts the sheet rear end regulating member 255. Thus, edge portions of sheets are aligned. Alignment in the direction of width of the sheets is performed by the alignment plates 258. The bundle discharge roller pair 270 supports a sheet bundle by sandwiching and discharges the sheet bundle to the lower stack tray 281.

Figure 12:
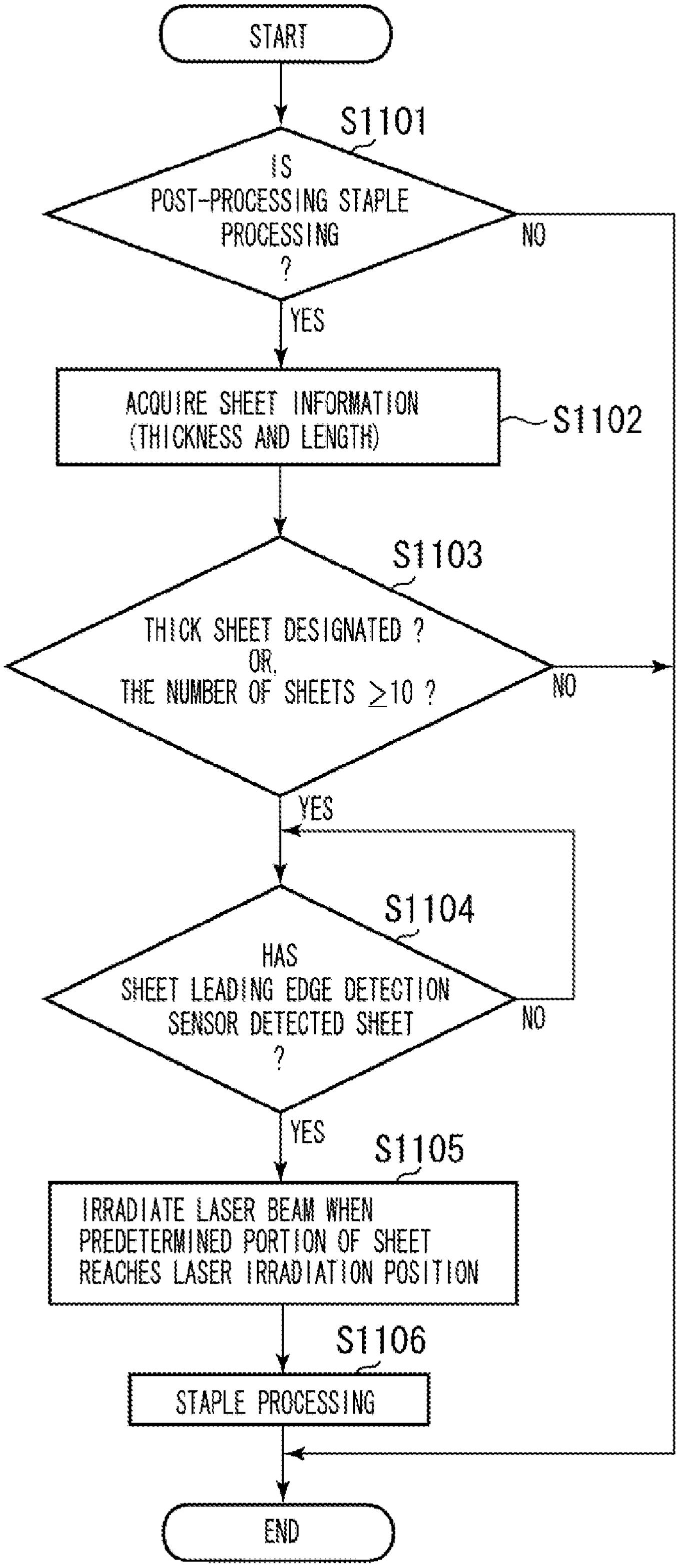
FIG. 12 is a flowchart illustrating an operation of the sheet processing apparatus according to an exemplary embodiment of the invention.

A stapling operation of the sheet processing apparatus 3 is described below with reference to FIG. 12. The sheet processing apparatus control unit 20 of the sheet processing apparatus 3 starts a stapling operation when receiving from the CPU circuit unit 10 an instruction to perform a stapling process and information on the thickness and length of the sheet. When receiving from the CPU circuit unit 10 information indicating that the thickness of the sheet is equal to or greater than a predetermined value, or that the number of sheets is equal to or greater than 10, the sheet processing apparatus control unit 20 enters an operation mode for forming a groove on the sheet (steps S1101 to S1103). Thus, grooves are formed on sheets of the sheet bundle only in a case where the sheet processing apparatus control unit 20 determines that it is necessary to form a groove on each sheet of the sheet bundle. Consequently, a total sheet processing time can be reduced.

The sheet processing apparatus 3 guides a sheet to the sheet conveyance apparatus 2 via the inlet roller pair 301 and the conveyance roller pairs 302 and 303. The sheet has already been reversed by the reversing path 170. The sheet is detected by the sheet edge detection sensor 340 in step S1104. Subsequently, when a rear end portion of the sheet reaches a position at which the sheet is irradiated with laser beams by the laser processing unit 320, the laser processing unit 320 forms a groove X on the rear surface of the sheet in step S1105. The "rear surface" of the sheet refers to a surface corresponding to a page number which advances more than a page number corresponding to the other surface between both surfaces of each sheet of a sheet bundle. The appearance of the sheet bundle can be enhanced by forming a groove on a surface on the side which is externally invisible before the sheet is folded back.

Because the rear edge portions of the sheets are bound by the stapler 257 serving as a binding unit, the groove X is formed in the vicinity of the rear edge portion (corresponding to an upstream side in the sheet conveying direction) of the sheet.

The sheet conveyance apparatus 2 feeds the sheet, on a surface of which the groove has been formed, into the sheet processing apparatus body 3A via the discharge roller pair 305, without reversing the sheet with the sheet reversing portion 310.

The sheet processing apparatus body 3A receives the sheet, which has been conveyed by the sheet conveyance apparatus 2, at the inlet roller pair 201. Then, the sheet processing apparatus body 3A causes a switching flapper (not shown) to guide the received sheet to the sorting upstream conveyance path 250. The guided sheet is discharged to the sheet processing tray 254 via the sorting downstream conveyance path 252.

The sheet discharged to the sheet processing tray 254 contacts the sheet rear end regulating member 255. Then, the edge portions of the sheets are aligned. Also, the width alignment of the sheets is performed by the alignment plates 258. The sheet is stacked on the sheet processing tray 254 such that the surface on which an image has been formed faces downward and the surface on which the groove has been formed faces upward.

When a predetermined number of sheets are stacked as a bundle on the sheet processing tray 254, the stapler 257 for staple-sorting binds the rear edge portion of the sheet bundle in step S1106. The stapler 257 performs two-position binding on the sheet bundle as illustrated in FIG. 11A or performs one-position corner binding on the sheet bundle as illustrated in FIG. 11B. Then, the sheet processing apparatus body 3A causes the bundle discharge roller pair 270 to push and discharge the bound sheet bundle to the lower stack tray 281.

As described above, the sheet processing apparatus 3 according to the present embodiment forms, with a laser beam, the groove X in the vicinity of a binding portion of the sheet bundle, which is bound by the staple Y. Thus, the sheet bundle can be bound such that unbound edge portions of sheets of the sheet bundle are easy to open.

The sheet processing apparatus 3 is configured to form the groove X in a case where the number of sheets is equal to or greater than a predetermined number (e.g., 10), or where the thickness of the sheet is equal to or greater than a predetermined thickness (e.g., thick paper having a grammage of 128 $g/m^2$). However, the predetermined number and the predetermined thickness can be different. In this case, the sheet processing apparatus 3 can be configured such that when information indicating the material and grammage of the sheet is input, the sheet processing apparatus 3 determines whether to form the groove X according to data indicating the stiffness (in this case, the Gurley stiffness which is equal to or greater than 6 Nm) of the sheet stored in the database. However, the groove X can be formed regardless of the number of sheets or the thickness of the sheet.

Although data indicating the thickness and type of the sheet is input by a user via the operation unit 19 in the present embodiment, instead, a sheet thickness detection sensor can be provided upstream of the laser processing unit 320. The thickness and type of the sheet can be determined according to an operation of the sheet thickness detection sensor. The sheet thickness detection sensor can be configured to detect the thickness of the sheet by sensing the position of an axis of each roller of the inlet roller pair 301 or the conveyance roller pair 302, the distance of the rollers of which varies with the thickness of the sheet.

Figure 13:
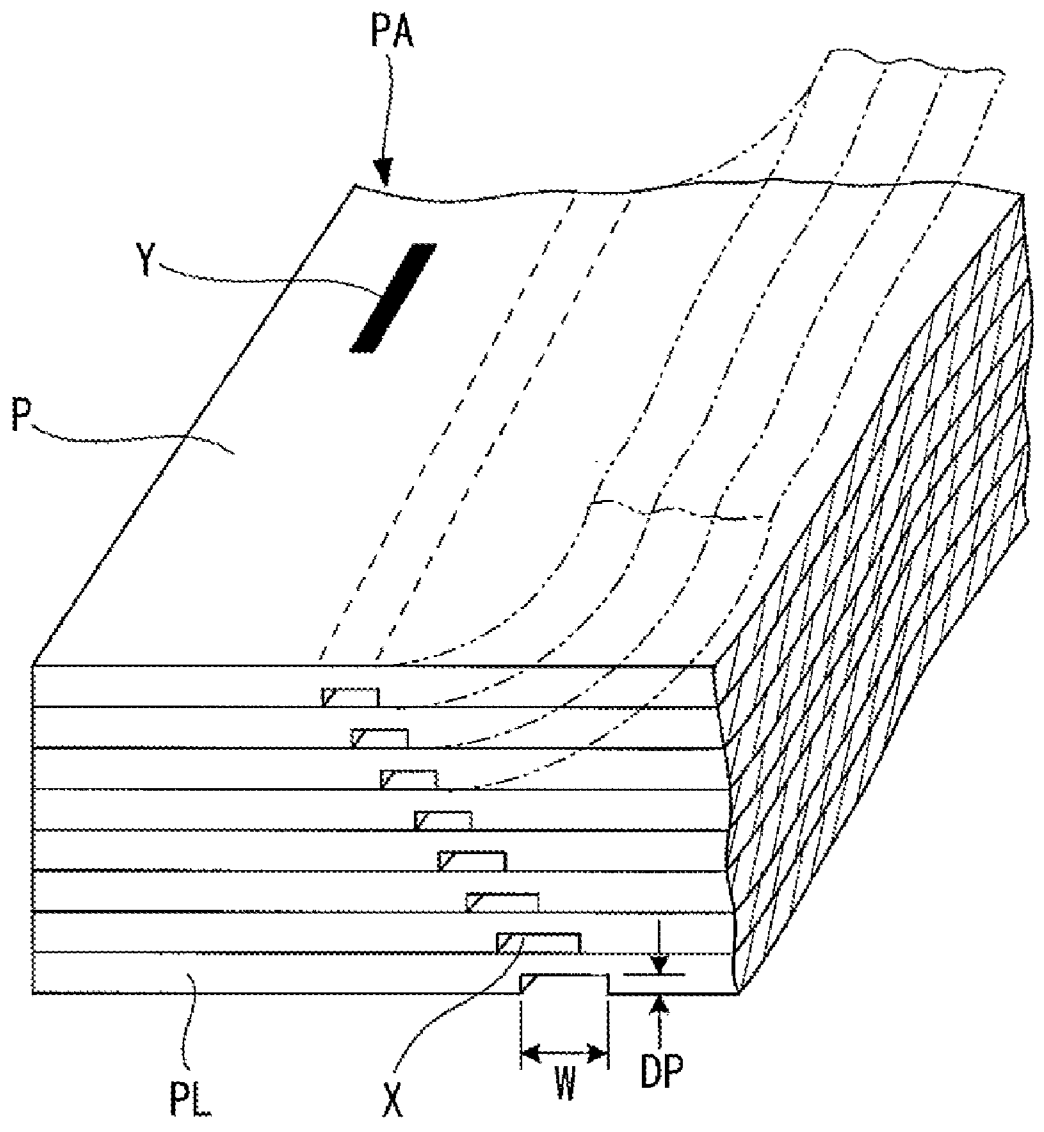
FIG. 13 is a perspective view illustrating a bundle of sheets in each of which a groove is formed by the sheet processing apparatus according to an exemplary embodiment of the invention.

As illustrated in FIG. 13, the closer the sheet, on which the groove X is formed, is to the last sheet PL whose page number advances most with the folded sheets of the sheet bundle, the larger the width W of the groove X is. Thus, when the sheets are folded like a letter "U", as indicated by chain double-dashed lines, inner sheets are easy to cover with outer sheets. Consequently, the sheet bundle is easy to unfold. The sheet processing apparatus 3 according to the present exemplary embodiment is configured to set the width W of the groove S such that the width W of the groove X corresponding to each of the first to tenth sheets from the folding side is about 450 μm, the width W of the groove X corresponding to each of the eleventh to twentieth sheets is about 900 μm, and the width W of the groove X corresponding to each of the twenty-first to thirtieth sheets is about 1350 μm. In a case where the number of sheets of the sheet bundle is more than 30, the width W of the groove X is increased by about 450 μm at every increase of the page number corresponding to ten sheets. Consequently, the sheet bundle is easy to unfold. Also, the sheet bundle is unlikely to self-restore to an initial shape. Although the width W of the groove X is increased in incremental steps in the present exemplary embodiment, the width W of the groove X can be linearly increased at every increase of one sheet. The depth DP of the groove X is set according to sheet information on the type of the sheet or the thickness of the sheet. The depth DP of the groove X set according to the same sheet information is uniform.

The groove X can be formed at the same distance from the staple Y regardless of the number of pages corresponding to sheets. However, if, as illustrated in FIGS. 11A and 11B, the closer the sheet, on which the groove X is formed, is to the last sheet PL in folding back sheets of the sheet bundle, the more distant the groove X is formed at a position away from the binding portion bound by the staple Y, the sheet bundle becomes easy to open. This is because setting the fold position away from the binding portion according to an increase of the thickness of the folded sheets enables the folded sheets to be easily folded back. The last sheet PL can be set as a back cover. The groove X can be formed at a position more distant from the binding portion and at a larger width as the page number corresponding to the sheet advances.

Figure 14:
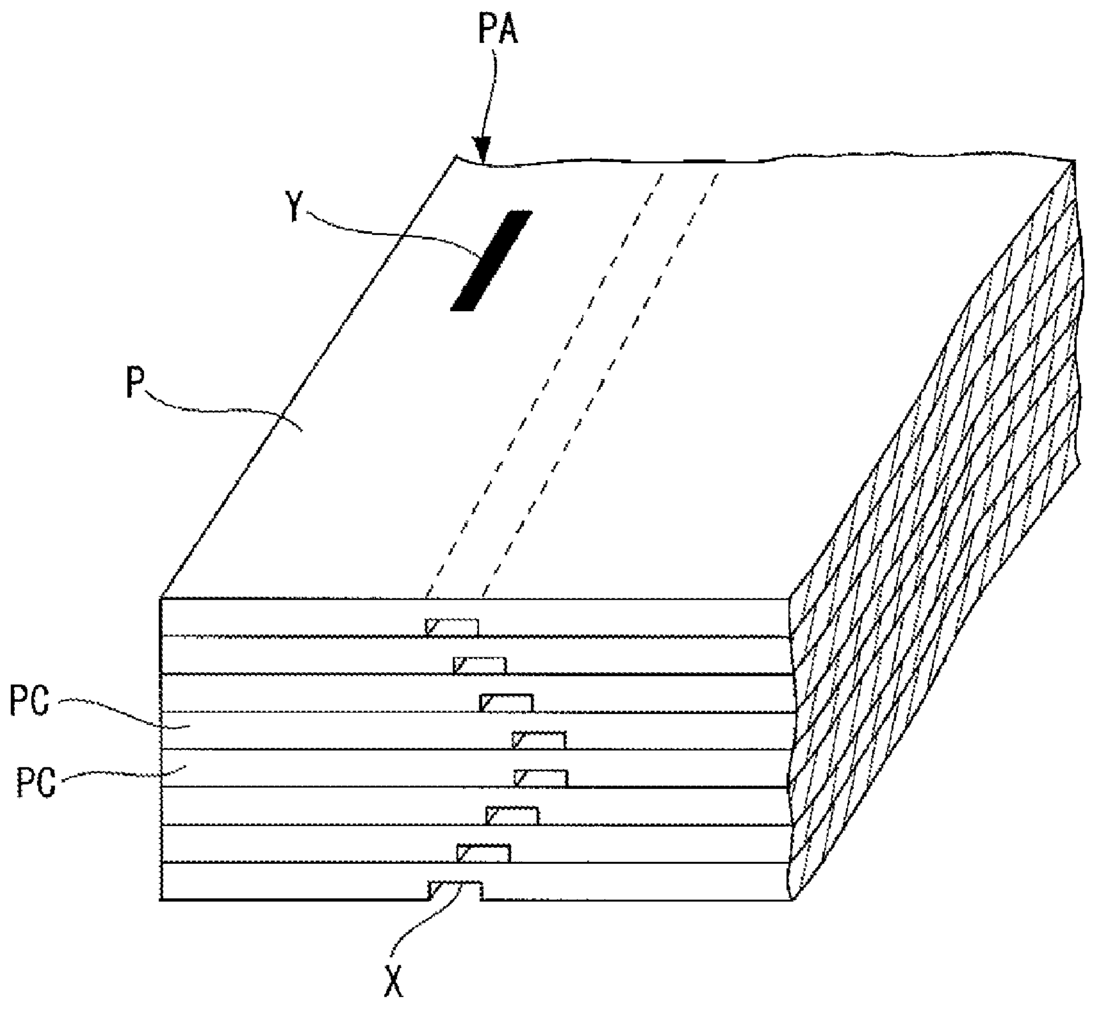
FIG. 14 is a perspective view illustrating a bundle of sheets in each of which a groove is formed by the sheet processing apparatus according to an exemplary embodiment of the invention.
Figure 15:
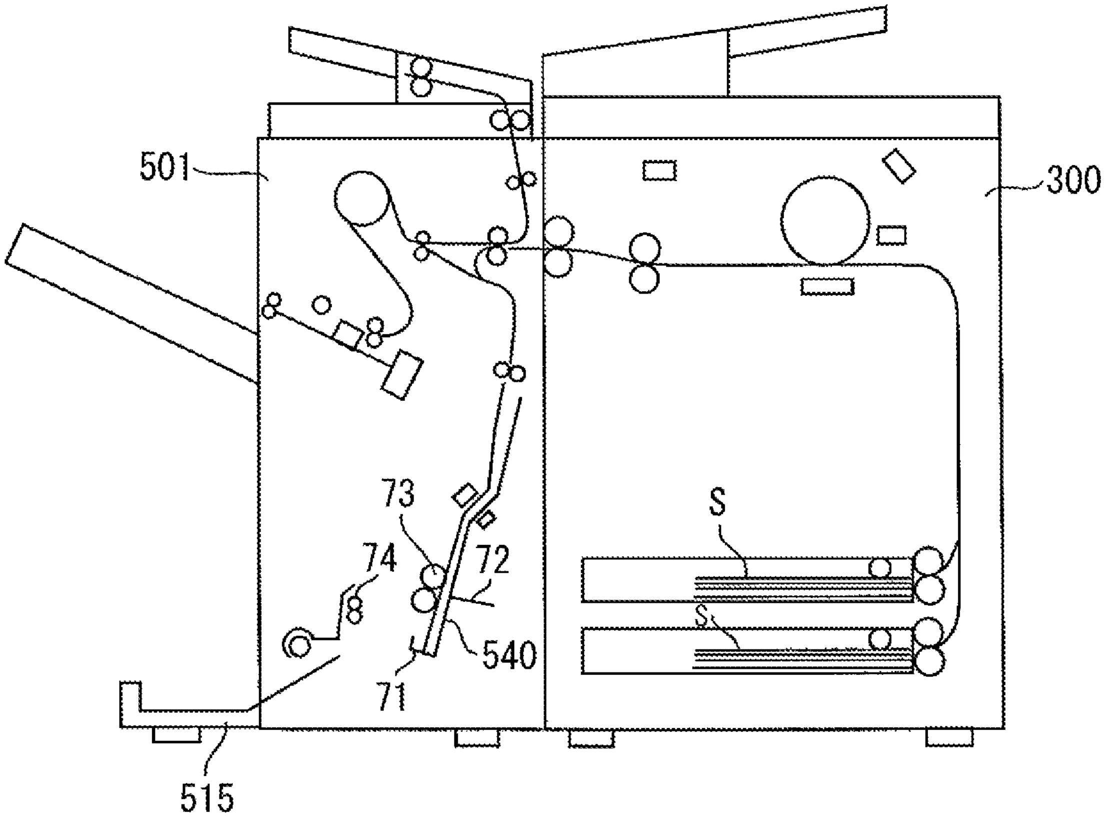
FIG. 15 PRIOR ART
FIG. 15 illustrates an image forming apparatus and a sheet processing apparatus which has a conventional bookbinding apparatus.

Furthermore, as illustrated in FIG. 14, the closer the sheet, on which the groove X is formed, is to the center in the direction of width of the sheet bundle PA, the more distant the position, at which the groove X is formed, can be from the binding portion bound by the staple Y. Thus, the sheet bundle PA is easy to open from both sides. Also in this case, the groove X can be formed such that the width of the groove X increases as the page number corresponding to the sheet advances.

It is unnecessary that the grooves are formed on all of the sheets. The appearance of the sheet bundle can be improved by forming no groove on a sheet corresponding to the back cover at the last page of the sheet bundle.

The above-described sheet bundle is bound with staples. However, the sheet bundle can be bound with glue. The groove can be formed with a cutter instead of laser beams. The widthwise cross-sectional shape of the groove is a square. However, the widthwise cross-sectional shape of the groove can be a semicircle or a V-shape.

At least one of the width W and the depth DP of the groove can be set at a large value according to at least one of the number of sheets, the thickness of the sheet, and the stiffness of the sheet. Thus, the stiffness of the sheet of the sheet bundle is reduced. Consequently, the sheet of the sheet bundle PA can easily be folded.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-245003 filed Sep. 11, 2006 and No. 2006-245004 filed Sep. 11, 2006, which are hereby incorporated by reference herein in their entirety.

What is claimed is:

1. A sheet processing apparatus configured to bind a sheet bundle, the sheet processing apparatus comprising:

a folding portion configured to fold the sheet bundle;

a laser processing unit configured to form a groove on a sheet by reducing thickness of the sheet with laser beams at a fold position of the sheet bundle to be folded by the folding portion; and a controller configured to control the laser processing unit to vary a width of the groove formed on the sheet, wherein the controller controls an operation of the laser processing unit such that a width of a groove formed on a sheet located on an outer side of the folded sheet bundle is larger than that of a groove formed on a sheet located on an inner side of the folded sheet bundle.

2. The sheet processing apparatus according to claim 1, wherein the controller controls the operation of the laser processing unit such that the width of the groove is varied with each sheet of the sheet bundle.

3. The sheet processing apparatus according to claim 1, wherein the controller controls the operation of the laser processing unit such that the width of the groove is varied with each a plurality of sheets of the sheet bundle.

4. The sheet processing apparatus according to claim 1, wherein the controller controls the operation of the laser processing unit to vary the width of the groove according to at least one of a thickness of a sheet of the sheet bundle and the number of sheets of the sheet bundle.

5. The sheet processing apparatus according to claim 1, further comprising a binding unit configured to bind the sheet bundle at the fold portion of the sheet bundle to be folded by the folding portion, wherein the controller controls the operation of the laser processing unit to form the groove on a portion of the fold portion other than a portion on which the binding is performed by the binding unit.

6. The sheet processing apparatus according to claim 1, wherein the controller controls the operation of the laser processing unit to form no groove on a sheet located innermost in the folded sheet bundle.

7. An image forming apparatus comprising:

an image forming portion configured to form an image on a sheet; and the sheet processing apparatus according to claim 1, wherein the folding portion folds into two a bundle of sheets on each of which an image is formed by the image forming portion.

8. An image forming apparatus comprising:

an image forming portion configured to form an image on a sheet;

a sheet processing apparatus configured to process a bundle of sheets on which an image is formed; and a controller configured to control the sheet processing apparatus, wherein the sheet processing apparatus includes:

a folding portion configured to fold the sheet bundle; and a laser processing unit configured to form a groove on a sheet by reducing thickness of the sheet with laser beams at a fold position of the sheet bundle to be folded by the folding portion, wherein the controller is configured to control the laser processing unit to vary a width of the groove formed on the sheet, and controls an operation of the laser processing unit such that a width of a groove formed on a sheet located on an outer side of the folded sheet bundle is larger than that of a groove formed on a sheet located on an inner side of the folded sheet bundle.

9. The image forming apparatus according to claim 8, wherein the controller controls the operation of the laser processing unit such that the width of the groove is varied with each sheet of the sheet bundle.

10. The image forming apparatus according to claim 8, wherein the controller controls the operation of the laser processing unit such that the width of the groove is varied with each of a plurality of sheets of the sheet bundle.

11. The image forming apparatus according to claim 8, wherein the controller controls the operation of the laser processing unit to vary the width of the groove according to at least one of a thickness of a sheet of the sheet bundle and the number of sheets of the sheet bundle.

12. The image forming apparatus according to claim 8, further comprising a binding unit configured to bind the sheet bundle at the fold portion of the sheet bundle to be folded by the folding portion, wherein the controller controls the operation of the laser processing unit to form the groove on a portion of the fold portion other than a portion on which the binding is performed by the binding unit.

13. The image forming apparatus according to claim 8, wherein the controller controls the operation of the laser processing unit to form no groove on a sheet located innermost in the folded sheet bundle.

* * * * *